US008206213B2

(12) United States Patent
Inamura

(10) Patent No.: US 8,206,213 B2
(45) Date of Patent: Jun. 26, 2012

(54) GAMING MACHINE AND SYSTEM FOR ACQUIRING ODDS INFORMATION FROM A PLURALITY OF BOOKMAKERS

(75) Inventor: Yukinori Inamura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1120 days.

(21) Appl. No.: 11/976,302

(22) Filed: Oct. 23, 2007

(65) Prior Publication Data

US 2009/0111552 A1 Apr. 30, 2009

(30) Foreign Application Priority Data

Oct. 24, 2006 (JP) ................................ 2006-288377

(51) Int. Cl.
*G06F 17/00* (2006.01)
*G06F 19/00* (2011.01)
*A63F 9/24* (2006.01)
*A63F 13/00* (2006.01)

(52) U.S. Cl. ................. 463/25; 463/16; 463/20; 700/91

(58) Field of Classification Search .................... 463/25, 463/40–42; 700/91–93
See application file for complete search history.

(56) References Cited

U.S. PATENT DOCUMENTS

| | | | | | |
|---|---|---|---|---|---|
| 4,775,937 | A * | 10/1988 | Bell | 463/28 |
| 5,564,977 | A * | 10/1996 | Algie | 463/25 |
| 5,573,244 | A * | 11/1996 | Mindes | 463/26 |
| 5,672,106 | A * | 9/1997 | Orford et al. | 463/28 |
| 5,713,793 | A * | 2/1998 | Holte | 463/25 |
| 6,099,409 | A * | 8/2000 | Brenner et al. | 463/40 |
| 6,604,999 | B2 | 8/2003 | Ainsworth | |
| 6,722,980 | B2 * | 4/2004 | Stronach | 463/25 |
| 6,773,347 | B1 * | 8/2004 | Marshall et al. | 463/25 |
| 7,699,701 | B2 * | 4/2010 | Corbo | 463/25 |
| 2002/0065124 | A1 | 5/2002 | Ainsworth | |
| 2002/0068633 | A1 * | 6/2002 | Schlaifer | 463/43 |
| 2002/0151340 | A1 * | 10/2002 | Guinn et al. | 463/16 |
| 2003/0008711 | A1 * | 1/2003 | Corbo | 463/42 |
| 2005/0079910 | A1 * | 4/2005 | Fujimoto | 463/25 |
| 2005/0176507 | A1 * | 8/2005 | Ephrati et al. | 463/39 |
| 2005/0227757 | A1 * | 10/2005 | Simon | 463/25 |
| 2006/0183547 | A1 * | 8/2006 | McMonigle | 463/40 |
| 2007/0021172 | A1 * | 1/2007 | Black | 463/16 |
| 2007/0082740 | A1 * | 4/2007 | Stearns et al. | 463/42 |
| 2011/0003634 | A1 * | 1/2011 | Manteris | 463/25 |

* cited by examiner

*Primary Examiner* — Milap Shah

(74) *Attorney, Agent, or Firm* — KMF Patent Services, PLLC; Kenneth M. Fagin, Esq.

(57) ABSTRACT

In a gaming machine 10, after the coins to be credited reaches 100 pieces, a bookmaker button is pushed through a touch panel 69, from a bookmaker selection screen displayed in a lower image display panel 16, so that a desired bookmaker is selected among a plurality of bookmakers. Thereby, the odds information provided from the bookmakers is compared for each bookmaker. In addition, from the bookmaker selection screen displayed in the lower image display panel 16, a Best Odds button is pushed through the touch panel 69, so that the odds of a high payout advantageous to a player are collected from the odds provided from the bookmakers.

8 Claims, 21 Drawing Sheets

F I G. 7 player information database

| user ID | password | the number of coins acquired | ranking |
|---|---|---|---|
| a 1 b 2 c | ???? | 3 0 0 pieces | 8 th place |
| a a a z z | **** | 3 5 0 pieces | 5 th place |
| 987ZY | #### | 4 0 pieces | 6 5 th place |
| A B C D E | %%%% | 1 2 0 pieces | 2 2 th place |
| 1 2 3 4 5 | ¥¥¥¥ | 5 4 0 pieces | first place |
| ⋮ | ⋮ | ⋮ | ⋮ |

GAMING MACHINE AND SYSTEM FOR ACQUIRING ODDS INFORMATION FROM A PLURALITY OF BOOKMAKERS

CROSS-REFERENCE TO RELATED APPLICATIONS

The present application claims all benefits of Japanese Patent Application No. 2006-288377 filed on Oct. 24, 2006 in the Japan Patent Office, the disclosures of which are incorporated herein by reference.

BACKGROUND OF THE INVENTION

1. Field of the Invention

The invention relates to a gaming machine and a gaming system, and more particularly, to a gaming machine and a gaming system, which display an image about odds information provided from a client setting the odds of various events.

2. Description of Related Art

In a conventional gaming machine, when a player inserts a game medium such as coin or bill into an insertion slot of the gaming machine and pushes a spin button, symbols are scroll-displayed in a display mounted on a front of a cabinet and the symbols are then stopped automatically.

In such gaming machine, as disclosed in U.S. Pat. No. 6,604,999 B2 or U.S. Patent No. 2002065124A1, for example, when the symbols stopped on a payline constitute a predetermined combination, the predetermined number of game media are paid out. In addition, when a certain symbol referred to as scatter symbol is displayed on the display, the predetermined number of game media are paid out in accordance with the number of scatter symbols displayed, irrespective of the payline. In other words, in the conventional gaming machine, the payout is made in combination with the two methods.

In the mean time, there is a bookmaker as a bookie that is officially approved by the England government. In the bookmaker, the betting object includes an election result, an exchange rate and a weather forecast as well as the sports such as horse racing, soccer and baseball. In recent years, the terminal devices for making a bet in the bookmaker are equipped in a variety of places.

However, the gaming machine disclosed in U.S. Pat. No. 6,604,999 B2 and U.S. Patent No. 2002065124A1 awards a win, i.e., pays out the game media depending on a combination of the symbols on a payline or the number of scatter symbols displayed in the display, and is only an apparatus for executing such a game.

In the mean time, the terminal device capable of voting in the bookmaker has a disadvantage that only a specific bookmaker becomes a banker to perform a voting.

The invention provides a gaming machine having a new entertainment characteristic and a gaming system.

More particularly, an object of the invention is to provide a gaming machine and a gaming system having a variety of functions as well as the function of awarding a win depending on whether a predetermined symbol is arranged on a payline or when the predetermined number of scatter symbols are stopped.

SUMMARY OF THE INVENTION

A gaming machine of the invention comprises a display unit that displays an image; an odds information acquiring unit that, from a server storing a plurality of odds information provided from a plurality of clients setting odds of a variety of events to be expected, acquires the odds information; and a display control unit that displays, in the display unit, an image about the odds information acquired by the odds information acquiring unit.

According to the above structure, a plurality of odds information provided from a plurality of clients is piled up in a server. The odds information of each client, which is transmitted from the server, is integrally displayed in a display unit. Thereby, a player is provided with the plurality of odds information piled up from each client and is thus enabled to have a more interest or concern in or about the gaming machine.

In the above gaming machine, preferably, the odds information acquiring unit acquires first odds information provided from the server by a predetermined client or second odds information having combined the odds advantageous to the player from the odds provided from the plurality of clients, and the display control unit displays, in the display unit, an image about the first odds information or an image about the second odds information, the first and second odds information being acquired by the odds information acquiring unit.

According to the above structure, first odds information provided by a predetermined client and second odds second odds information having combined the odds advantageous to the player from the odds provided from the plurality of clients are piled up in the server. The first odds information and/or second odds information transmitted from the server are displayed in the display unit of the gaming machine. Thereby, the player is provided with the plurality of odds information piled up from each client and is thus enabled to have a more interest or concern in or about the gaming machine.

The above gaming machine, preferably, further comprises a touch panel provided to the display unit. The display control unit displays, in the display unit, an operation key image enabling the player to select any one of the image about the first odds information and the image about the second odds information using the touch panel.

According to the above structure, an operation key enabling the first odds information or second odds information to be displayed is displayed.

Preferably, the gaming machine further comprises a value memory unit that stores a value acquired in a game to be executed with a value, and a determining unit that determines whether the value stored in the value memory unit reaches a predetermined amount. When the determining unit determines that the value stored in the value memory unit reaches a predetermined amount, the display control unit displays, in the display unit, an operation key image enabling the player to select whether the image about the odds information acquired by the odds information acquiring unit is displayed.

According to the above structure, an operation key, which enables the odds information to be displayed at a timing at which a value acquired in a game of the gaming machine reaches a predetermined amount, is displayed in the display unit.

In addition, the gaming machine further comprises a value memory unit that stores a value acquired in a game to be executed with a value, and an award button that awards the value stored in the value memory unit. When the award button is pushed, the display control unit may display, in the display unit, an operation key image enabling the player to select whether the image about the odds information acquired by the odds information acquiring unit is displayed.

According to the above structure, an operation key, which enables the odds information to be displayed at a timing at which a value acquired in a game of the gaming machine is awarded as the award button is pushed, is displayed in the display unit.

In order to achieve the above object, a gaming system of the invention comprises a server that is connected in data communication with a plurality of clients setting odds of a variety of events to be expected and stores a plurality of odds information provided from the plurality of clients, and a gaming machine that is connected in data communication with the server, receives the odds information from the server and provides the odds information to a player.

According to the above structure, a plurality of odds information provided from a plurality of clients is piled up in a server. The odds information of each client, which is transmitted from the server, is integrally displayed in a display unit. Thereby, a player is provided with the plurality of odds information piled up from each client and is thus enabled to have a more interest or concern in or about the gaming machine.

In the gaming system, preferably, the gaming machine comprises a display unit that displays an image, an odds information acquiring unit that acquires odds information from the server, and a display control unit that displays, in the display unit, an image about the odds information acquired by the odds information acquiring unit.

According to the above structure, a plurality of odds information provided from a plurality of clients is piled up in a server. The odds information of each client, which is transmitted from the server, is integrally displayed in a display unit. Thereby, a player is provided with the plurality of odds information piled up from each client and is thus enabled to have a more interest or concern in or about the gaming machine.

In the gaming system, preferably, the odds information acquiring unit acquires, from the server, first odds information provided by a predetermined client or second odds information having combined the odds advantageous to the player from the odds provided from the plurality of clients, and the display control unit displays, in the display unit, an image about the first odds information or an image about the second odds information, the first and second odds information being acquired by the odds information acquiring unit.

According to the above structure, first odds information provided by a predetermined client and second odds second odds information having combined the odds advantageous to the player from the odds provided from the plurality of clients are piled up in the server. The first odds information and/or second odds information transmitted from the server are displayed in the display unit of the gaming machine. Thereby, the player is provided with the plurality of odds information piled up from each client and is thus enabled to have a more interest or concern in or about the gaming machine.

In the gaming system, preferably, the gaming machine further comprises a touch panel provided to the display unit. The display control unit displays, in the display unit, an operation key image enabling the player to select any one of the image about the first odds information and the image about the second odds information using the touch panel.

According to the above structure, an operation key enabling the first odds information or second odds information to be displayed is displayed.

In the gaming system, preferably, the gaming machine further comprises a value memory unit that stores a value acquired in a game to be executed with a value, and a determining unit that determines whether the value stored in the value memory unit reaches a predetermined amount. When the determining unit determines that the value stored in the value memory unit reaches a predetermined amount, the display control unit displays, in the display unit, an operation key image enabling the player to select whether the image about the odds information transmitted from the server is displayed.

According to the above structure, an operation key, which enables the odds information to be displayed at a timing at which a value acquired in a game of the gaming machine reaches a predetermined amount, is displayed in the display unit.

In addition, in the gaming system, preferably, the gaming machine further comprises a value memory unit that stores a value acquired in a game to be executed with a value, and an award button that awards the value stored in the value memory unit. When the award button is pushed, the display control unit may display, in the display unit, an operation key image enabling the player to select whether the image about the odds information transmitted from the server is displayed.

According to the above structure, an operation key, which enables the odds information to be displayed at a timing at which a value acquired in a game of the gaming machine is awarded as the award button is pushed, is displayed in the display unit.

BRIEF DESCRIPTION OF THE DRAWINGS

Other and further objects, features and advantages of the invention will appear more fully from the following description taken in connection with the accompanying drawings, in which:

FIG. 7 shows a player information database to be stored in a hard disk drive of a server;

DESCRIPTION OF THE PREFERRED EMBODIMENTS

Hereinafter, the preferred embodiments of the invention will be described with reference to the drawings.

Firstly, an outline of an embodiment of the invention will be described with reference to FIG. 1. In a gaming machine 10 of this embodiment, a bookmaker button is pushed from a bookmaker selection screen, which is displayed in a lower image display panel 16 after the coins to be credited reach 100 pieces, through a touch panel 69, so that a desired bookmaker is selected among several bookmakers. Thereby, a player compares the odds information provided from the bookmakers for each bookmaker. In addition, when a Best Odds button is pushed through the touch panel 69 from the bookmaker selection screen displayed in the lower image display panel 16, it is possible to obtain, from the odds provided from the bookmakers, the information in which the odds having a high payout advantageous to a player are collected.

(Mechanical Structure of the Gaming Machine)

Figure 2:
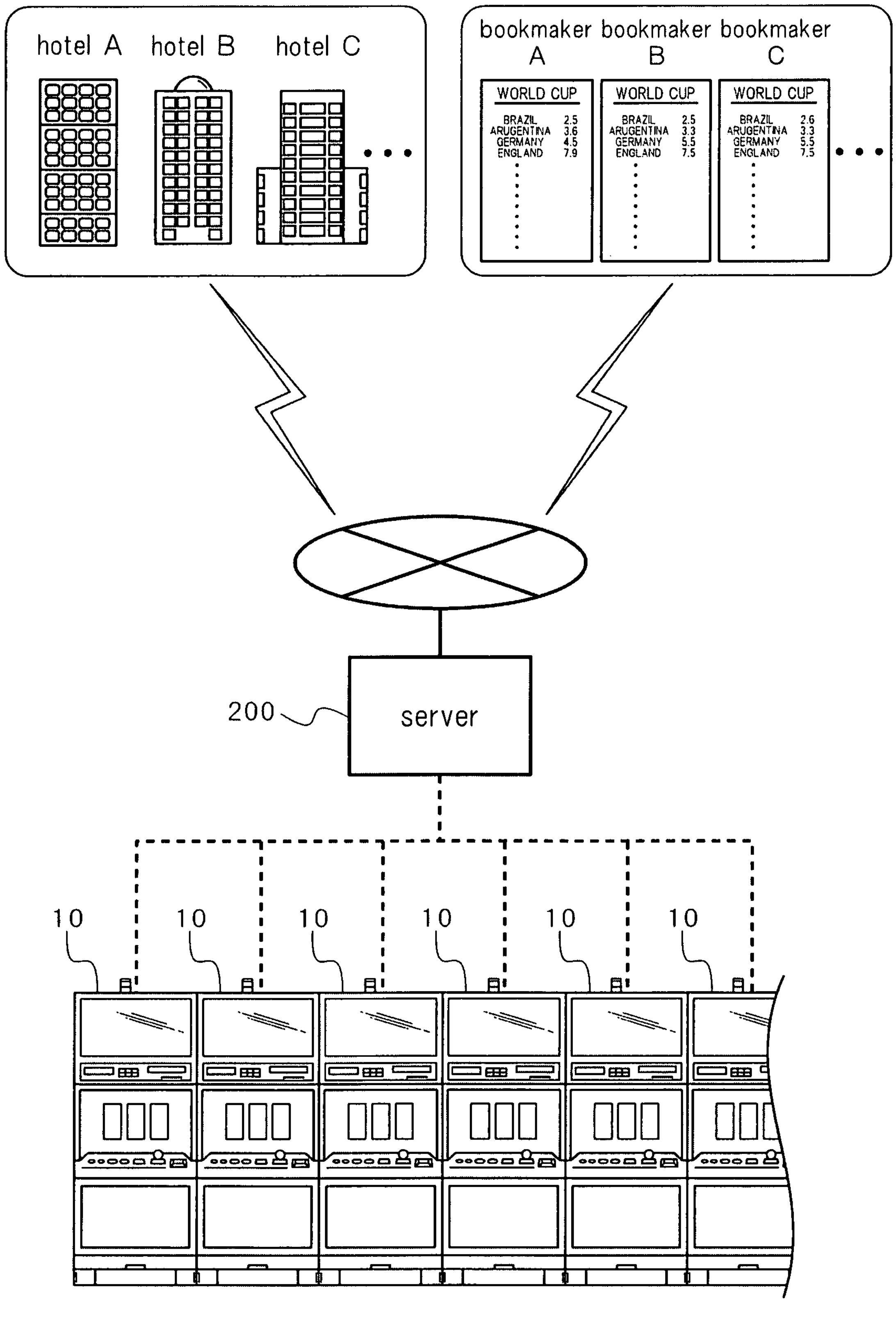
FIG. 2 shows a whole structure of a gaming system having a gaming machine.

As shown in FIG. 2, several gaming machines 10 are placed in a game arcade, and each gaming machine 10 is connected in data communication with a server 200. The server 200 is connected in data communication with a computer of a hotel in which a player stays or a bookmaker computer setting the odds of various events. In the gaming machine 10, a coin, bill or electronic negotiable information corresponding to them is used as a game medium for executing a unit game. Meanwhile, in the invention, the game medium is not particularly limited. For example, a medal, token, electronic money, ticket and the like can be used. The ticket is not particularly limited and may be a ticket with a barcode that will be described later.

Figure 1:
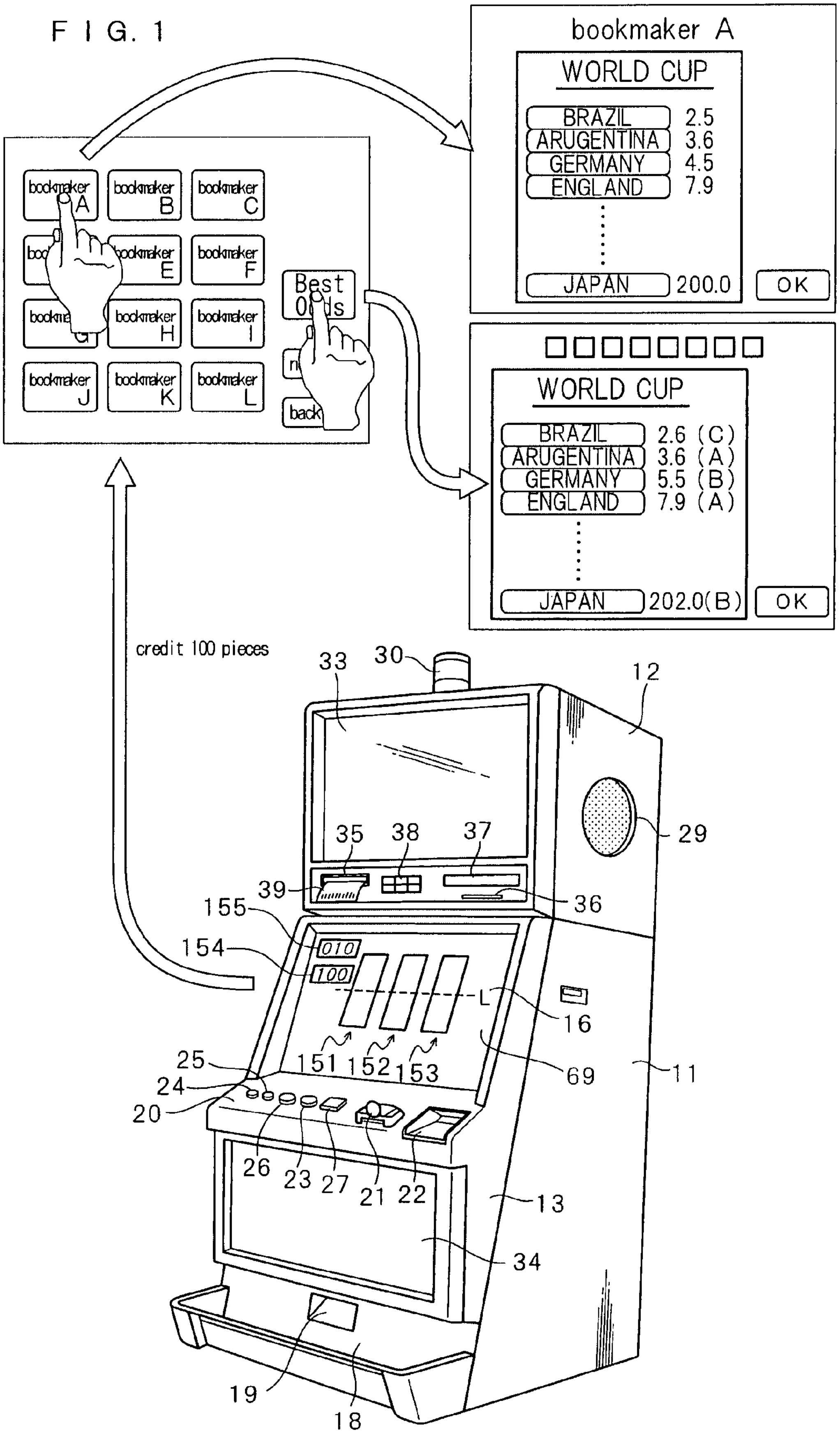
FIG. 1 illustrates an outline of a gaming machine according to an embodiment of the invention.

As shown in FIG. 1, the gaming machine 10 comprises a cabinet 11, a top box 12 provided to an upper part of the cabinet 11 and a main door 13 provided to a front of the cabinet 11. The main door 13 is provided with the lower image display panel 16. The lower image display panel 16 has a transparent liquid crystal panel for displaying a variety of information. The lower image display panel 16 displays a video reel and a variety of information and effect images relating to a game.

Specifically, the lower image display panel 16 displays the display windows 151~153 of 3 columns/3 rows, as shown in FIG. 1, and other effect images, as required.

In the mean time, in this embodiment, it is exemplified a case where the symbols of 3 columns/3 rows are displayed with the lower image display panel 16. However, the invention is not limited thereto. For example, a mechanical reel having symbols provided to a periphery thereof may be rotated and stopped to display symbols beyond the display windows 151~153.

One activated payline L is displayed in the lower image display panel 16. The payline L is set to horizontally traverse center stages 151*b* of the display windows 151~153. Meanwhile, in this embodiment, although the payline L traverses the center stages of the display windows 151~153, it may traverse the other stages of the display windows 151~153. For example, the payline L may traverse upper stages or lower stages of the display windows 151~153. Alternatively, the payline L may traverse the lower stage of the display window 151, the center stage of the display window 152 and the upper stage of the display window 153. Further, the payline L may be 2 or more. When two or more paylines L are provided, all paylines L may be activated and the number of paylines L relating to a predetermined condition such as bet-number of coins may be activated.

In the mean time, a credit-number display unit 154 and a payout-number display unit 155 are displayed in the lower image display panel 16. The credit-number display unit 154 displays a total number that the gaming machine 10 pays out to a player (which will be referred to as total credit-number). The payout-number display unit 155 displays the number of coins to be paid out when a combination of symbols stopped on the payline is a winning combination.

A touch panel 69 is provided to a front surface of the lower image display panel 16. The touch panel 69 has plural contact points in a matrix form of longitudinal and transverse directions and allows position information, which indicates longitudinal and transverse positions of the pressed contact points, to be outputted as a command signal. In the mean time, the touch panel 69 may be a touch panel adopted in a mobile terminal or ATM of a bank.

A control panel 20, a coin receiving slot 21 and a bill validator 22 are provided below the lower image display panel 16. The control panel 20 is provided with plural buttons 23~27. The buttons 23~27 allow instructions, which are related to a game progress by a player, to be inputted. The coin receiving slot 21 enables a coin to be received in the cabinet 11.

The control panel 20 is provided with a spin button 23, a change button 24, a cash out button 25 as the award button, a 1-BET button 26 and a MAX-BET button 27. The spin button 23 is a button for inputting an instruction to start the scroll of symbols. The change button 24 is a button to be used when a player asks a staff in the game arcade for exchange of money. The cash out button 25 is a button for inputting an instruction to pay out the coins of total credit-number into a coin tray 18.

The 1-BET button 26 is a button for inputting an instruction to bet one coin, among coins of the total credit-number, per one game. The MAX-BET button 27 is a button for inputting an instruction to bet maximum coins (for example, 50 coins), among coins of the total credit-number, per one game.

The bill validator 22 validates whether bill is normal or not and receives the normal bill into the cabinet 11. In the mean time, the bill validator 22 can read a ticket 39 having a barcode that will be described later. When the bill validator 22 reads the ticket 39 having a barcode, it outputs a reading signal relating to the read content to a main CPU 41.

A belly glass 34 is provided to a lower frontal surface of the main door 13, i.e., below the control panel 20. A character of the gaming machine 10 and the like are drawn on the belly glass 34. An upper image display panel 33 is mounted to a front of the top box 12. The upper image display panel 33 has a liquid crystal panel and displays, for example, an effect image and an image indicating an introduction of a game content and an explanation of a game rule.

To the top box 12 is mounted a speaker 29 for outputting voice. A ticket printer 35, a card reader 36, a data displayer 37 and a keypad 38 are provided below the upper image display panel 33. The ticket printer 35 prints a barcode having data encoded thereto, such as credit-number, date and time, identification number of the gaming machine 10 and the like, onto a ticket, thereby outputting the ticket 39 having the barcode. The player can play a game in another gaming machine with the ticket 39 having a barcode and exchange the ticket 39 having a barcode with bill in a change booth of the game arcade.

The card reader 36 reads and writes the data from and into a smart card. The smart card is a card carried by a player, into which data for identifying the player, such as player ID and user password and data relating to a game history of the player are memorized.

The data displayer 37 consists of a fluorescent display and the like, and displays the data (for example, player ID) read by the card reader 36 and the data inputted by the player through the keypad 38. The keypad 38 inputs instructions or data relating to a ticket issue. In the mean time, according to an embodiment of the invention, the keypad may not be provided and a keypad image allowing a player to operate the touch panel 69 may be displayed in the lower image display panel 16.

(Electrical Structure of the Gaming Machine)

Figure 3:
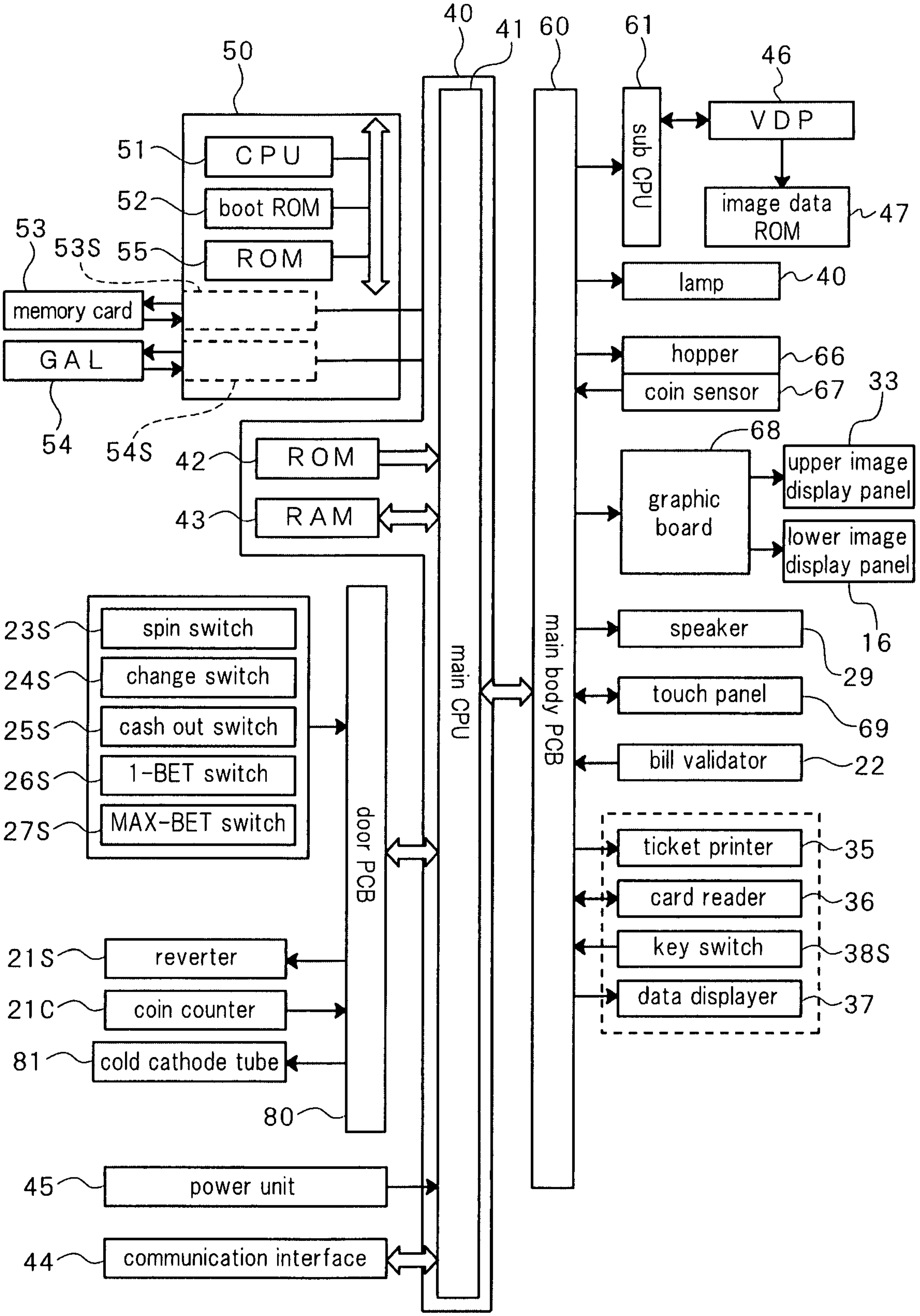
FIG. 3 is a block diagram of a gaming machine.

A control unit is mounted in the cabinet 11. As shown in FIG. 3, the control unit comprises a motherboard 40, a main body PCB (Printed Circuit Board) 60, a gaming board 50, a sub CPU 61, a door PCB 80, and various switches and sensors.

The gaming board 50 is provided with a CPU (Central Processing Unit) 51, a ROM 55 and a boot ROM 52 which are connected to each other by an internal bus, a card slot 53S corresponding to a memory card 53 and an IC socket 54S corresponding to a GAL (Generic Array Logic) 54.

The memory card 53 stores a game program and a game system program therein. The game program includes a stop symbol determining program. The stop symbol determining program is a program for determining a symbol (code number corresponding to the symbol) to be stopped on the payline L. The stop symbol determining program includes symbol weight data corresponding to each of plural payout rate (for example, 80%, 84%, 88%). The symbol weight data is data representing a correspondence relation between the code number of each symbol and 1 or plural random numbers belonging to a predetermined numerical range (0~256) for each of the display windows 151~153.

The payout rate is determined on the basis of data for setting a payout rate, which data is outputted from the GAL 54, and a stop symbol is determined on the basis of the symbol weight data corresponding to the payout rate.

Further, the memory card 53 stores various data used for the game program and the game system program. Specifically, the data representing a relationship between the symbols 180 displayed in the display windows 151~153 of FIG. 1 and the code numbers is stored in a data table form. In the mean time, these data are transmitted to a RAM 43 of the motherboard 40 when executing the game program.

In addition, the card slot 53S is structured to insert and remove the memory card 53 and connected to the motherboard 40 through an IDE bus. Accordingly, it is possible to change a type or content of a game to be executed in the gaming machine 10, by removing the memory card 53 from the card slot 53S, writing another game program and game system program in the memory card 53 and inserting the memory card 53 into the card slot 53S.

The game program includes a program relating to a game progress and a program for shifting a gaming state into a bonus game. In addition, the game program includes the image data or sound data to be outputted during the game.

The GAL 54 is provided with plural input and output ports. When the data is inputted into the input ports, the GAL 54 outputs data corresponding to the inputted data from the output ports. The data outputted from the output ports is the data for setting a payout rate that has been described above.

The IC socket 54S is structured to attach and detach the GAL 54. The IC socket 54S is connected to the motherboard 40 through a PCI bus. Accordingly, it is possible to change the data for setting a payout rate that is outputted from the GAL 54, by detaching the GAL 54 from the IC socket 54S, rewriting the program stored in the GAL 54 and then attaching the GAL 54 to the IC socket 54S.

The CPU 51, the ROM 55 and the boot ROM 52, which are connected to each other by the internal bus, are connected to the motherboard 40 through the PCI bus. The PCI bus carries out a signal transfer between the motherboard 40 and the gaming board 50 and supplies power to the gaming board 50 from the motherboard 40. The ROM 55 stores nation identification information and an authentication program. The boot ROM 52 stores a preliminary authentication program and a program (boot code) enabling the CPU 51 to execute the preliminary authentication program.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified, i.e., for authenticating the authentication program.

The motherboard 40 is provided with a main CPU 41 (controller), a ROM (Read Only Memory) 42, a RAM (Random Access Memory) 43 and a communication interface 44.

The main CPU 41 has functions of a controller for controlling the whole gaming machine 10. In particular, the main CPU 41 carries out a control for outputting a command signal enabling the sub CPU 61 to scroll the symbols of the lower image display panel 16 when the spin button 23 is pushed after the credit is bet, a control for determining symbols to be stopped after the symbols are scrolled and a control for stopping the determined symbols in the display windows 151~153.

In other words, the main CPU 41 has functions of an arrangement controller for selecting and determining arrangement symbols with regard to a symbol matrix from the plural types of symbols so as to rearrange the symbols as a new symbol matrix after scrolling the plural symbols to be displayed in the lower image display panel 16, and executing an arrangement control which will be stopped at the determined symbols from the scroll state.

In addition, the main CPU 41 carries out a control of determining whether the credit-number stored in the RAM 43 reaches 100 pieces and outputting a command signal to instruct the graphic board 68 to display a sub game screen in the lower image display panel 16 when the credit-number reaches 100 pieces. Further, the main CPU 41 carries out a control of outputting a command signal to instruct the graphic board 68 to display an ID•password input screen (refer to FIG. 10) and the like in the lower image display panel 16. Additionally, the main CPU 41 performs a control of receiving a variety of data (ranking data of a game, premium data and bookmaker data) from the server 200 and outputting a command signal to instruct the graphic board 68 to display a variety of screens (ranking screen (refer to FIG. 12), premium selection screen (refer to FIG. 16) and bookmaker selection screen (refer to FIG. 19)) in the lower image display panel 16.

The ROM 42 stores a program such as BIOS (Basis Input/Output System) executed by the main CPU 41, and data that is permanently used. When the BIOS is executed by the main CPU 41, each of peripheral devices is initialized and the game program and the game system program stored in the memory card 53 are read out through the gaming board 50.

The RAM 43 stores the data or program that is used when the main CPU 41 carries out a process. To be more specific, the RAM 43 stores the number of coins acquired through a game, which is referred to by the main CPU 41 when the cash out button 25 is pushed, and the like.

The communication interface 44 is provided to data communicate with the server 200 and the like through a communication line. Specifically, from the server 200 that stores a plurality of odds data provided from a plurality of bookmakers setting the odds of various events to be expected or the room number data of a hotel, the odds data or room number data is acquired. The odds data provided from the server 200 includes the odds data set by a specific bookmaker (for example, odds data set by a bookmaker A) and the Best Odds data having combined the odds (odds having a high payout) advantageous to a player from the odds provided from the bookmakers.

In addition, the motherboard 40 is connected to the main body PCB (Printed Circuit Board) 60 and the door PCB 80 through a USB (Universal Serial Bus). Further, the motherboard 40 is connected to a power unit 45. When power is supplied to the motherboard 40 from the power unit 45, the main CPU 41 of the motherboard 40 is operated and the power is supplied to the gaming board 50 through the PCI bus, so that the CPU 51 is also operated.

The main body PCB 60 and the door PCB 80 are connected to a device or apparatus for producing an input signal that will be inputted to the main CPU 41, and a device or apparatus that is controlled by the control signal outputted from the main CPU 41. The main CPU 41 executes the game program and the game system program stored in the RAM 43, based on the input signal inputted to the main CPU 41, to carry out an arithmetic process, thereby storing a result thereof in the RAM 43 or transmitting a control signal to each device or apparatus to control it.

The main body PCB 60 is connected with a lamp 30, the sub CPU 61, a hopper 66, a coin sensor 67, a graphic board 68, the speaker 29, the touch panel 69, the bill validator 22, the ticket printer 35, the card reader 36, a key switch 38S and the data displayer 37.

The lights-on and out of the lamp 30 is controlled, based on a control signal outputted from the main CPU 41. The sub CPU 61 controls the scroll of symbols of the display windows 151~151 and is connected to a VDP (Video Display Processor) 46. The VDP 46 reads out image data of the symbols stored in an image data ROM 47, produces a scroll image to be displayed in the display windows 151~153 and outputs the scroll image in the lower image display panel 16.

The hopper 66 is mounted in the cabinet 11 and pays out the predetermined number of coins to the coin tray 18 from the coin payout slot 19, based on the control signal outputted from the main CPU 41. The coin sensor 67 is mounted in the coin payout slot 19 and outputs an input signal to the main CPU 41 when it detects that the predetermined number of coins are paid out from the coin payout slot 19.

The graphic board 68 controls an image display in the upper image display panel 33 and the lower image display panel 16, based on the control signal outputted from the main CPU 41. To be more specific, the graphic board 68 receives the command signal from the main CPU 41 and displays a button image to a player, which allows the player to select whether the coins credited in the lower image display panel 16 are exchanged with a predetermined premium or are bet on a predetermined event. In addition, the graphic board 68 receives the command signal from the main CPU 41 and displays a variety of screens (for example, ranking screen (refer to FIG. 12), premium selection screen (refer to FIG. 16) and bookmaker selection screen (refer to FIG. 19)) in which the operation keys such as keyboard, buttons and the like are displayed, based on the data (for example, ranking data of a game, premium data, bookmaker data and the like) transmitted from the server 200, which will be described later. In addition, the graphic board 68 is provided with a VDP for producing image data on the basis of the control signal outputted from the main CPU 41, a video RAM for temporarily storing the image data produced by the VDP, and the like.

The bill validator 22 reads an image of the bill and accommodates the normal bill in the cabinet 11. In addition, in accommodating the normal bill, the bill validator 22 outputs an input signal to the main CPU 41, based on an amount of the bill. The main CPU 41 stores a credit-number, which corresponds to the amount of the bill transmitted by the input signal, in the RAM 43.

The ticket printer 35 prints a barcode having data encoded thereto, such as credit-number stored in the RAM 43, date and time, identification number of the gaming machine 10 and the like, on a ticket, based on the control signal outputted from the main CPU 41, thereby outputting the ticket 39 having the barcode.

The card reader 36 reads the data from the smart card to transmit it to the main CPU 41, and writes the data into the smart card, based on the control signal outputted from the main CPU 41. The key switch 38S is mounted to the keypad 38, and outputs an input signal to the main CPU 41 when the player manipulates the keypad 38. The data displayer 37 displays the data that is read by the card reader 36 or the data that the player inputs through the keypad 38, based on the control signal outputted from the main CPU 41.

The door PCB 80 is connected with the control panel 20, a reverter 21S, a coin counter 21C and a cold cathode tube 81. The control panel 20 is provided with a spin switch 23S corresponding to the spin button 23, a change switch 24S corresponding to the change button 24, a cash out switch 25S corresponding to the cash out button 25, a 1-BET switch 26S corresponding to the 1-BET button 26 and a MAX-BET switch 27S corresponding to the MAX-BET button 27. Each of the switches 23S~27S outputs an input signal to the main CPU 41 when each of the corresponding buttons 23~27 is pushed by a player.

The coin counter 21C is mounted in the coin receiving slot 21 and validates whether a coin, which is inserted in the coin receiving slot 21 by the player, is normal or not. A coin except the normal coin is discharged from the coin payout slot 19. In addition, the coin counter 21C outputs an input signal to the main CPU 41 when it detects a normal coin.

The coin counter 21C is operated on the basis of the control signal outputted from the main CPU 41 and distributes a coin, which is recognized as a normal coin by the coin counter 21C, to a cash box (not shown) or hopper 66 mounted in the gaming machine 10. In other words, when the hopper 66 is fully filled with the coins, the normal coin is distributed into the cash box by the reverter 21S. In the mean time, when the hopper 66 is not fully filled with the coins, the normal coin is distributed into the hopper 66. The cold cathode tube 81 functions as a backlight mounted to rear sides of the lower image display panel 16 and the upper image display panel 33 and is turned on/off, based on the control signal outputted from the main CPU 41.

(Structure of the Server)

Figure 4:
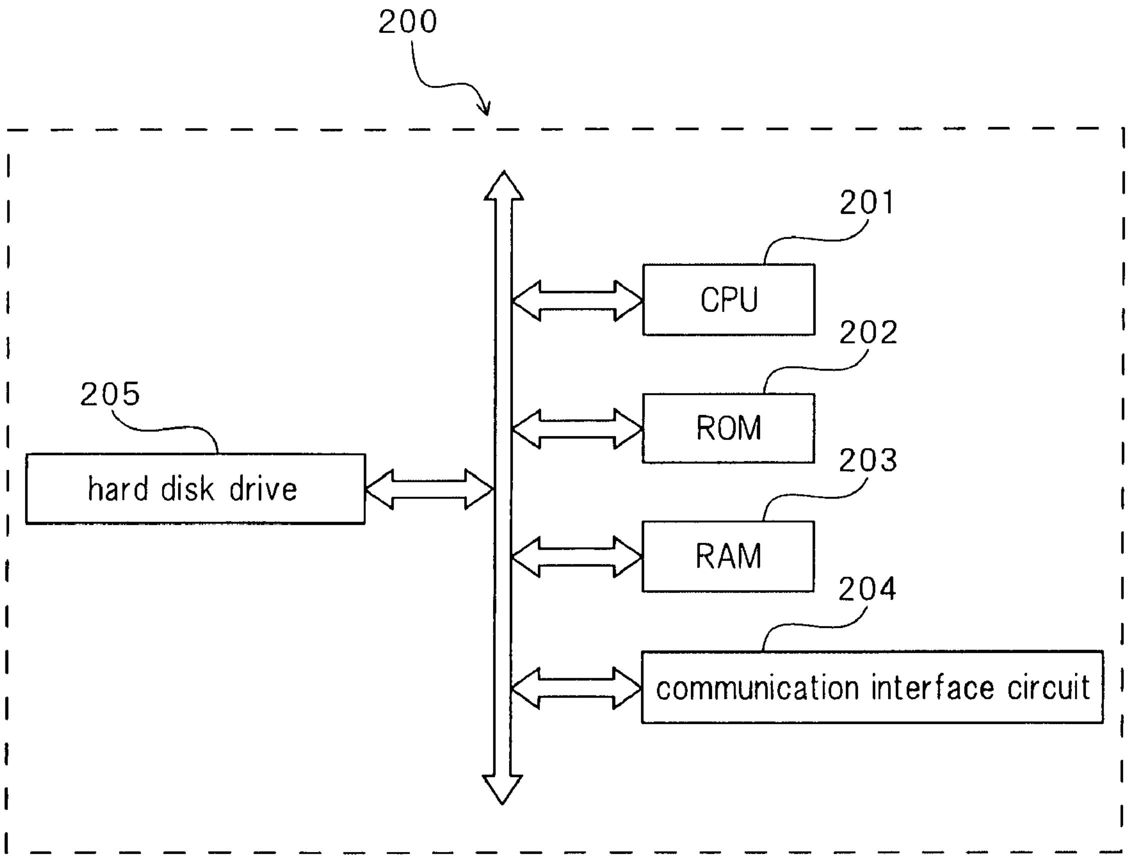
FIG. 4 is a block diagram of a server.

As shown in FIG. 2, the server 200 is connected with a plurality of the gaming machines 10 placed in a game arcade in a data communication manner and is also connected with each computer placed in a hotel and each computer of the bookmaker setting the odds of the various events. The server 200 receives and stores the room number data of each hotel and the odds data set by each bookmaker. The server 200 comprises, as shown in FIG. 4, a CPU 201 as a processor, a ROM 202, a RAM 203, a communication interface 204 for data communicating with the gaming machine 10 and a hard disk drive 205.

Figure 5:
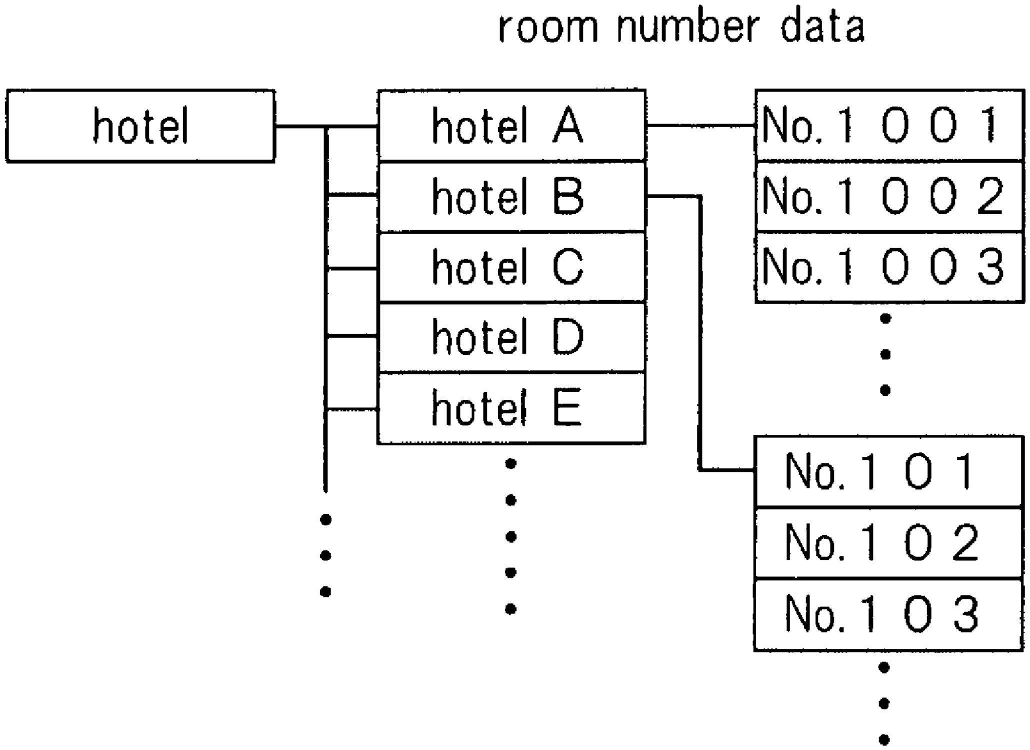
FIG. 5 shows room number data to be stored in a hard disk drive of a server.
Figure 6:
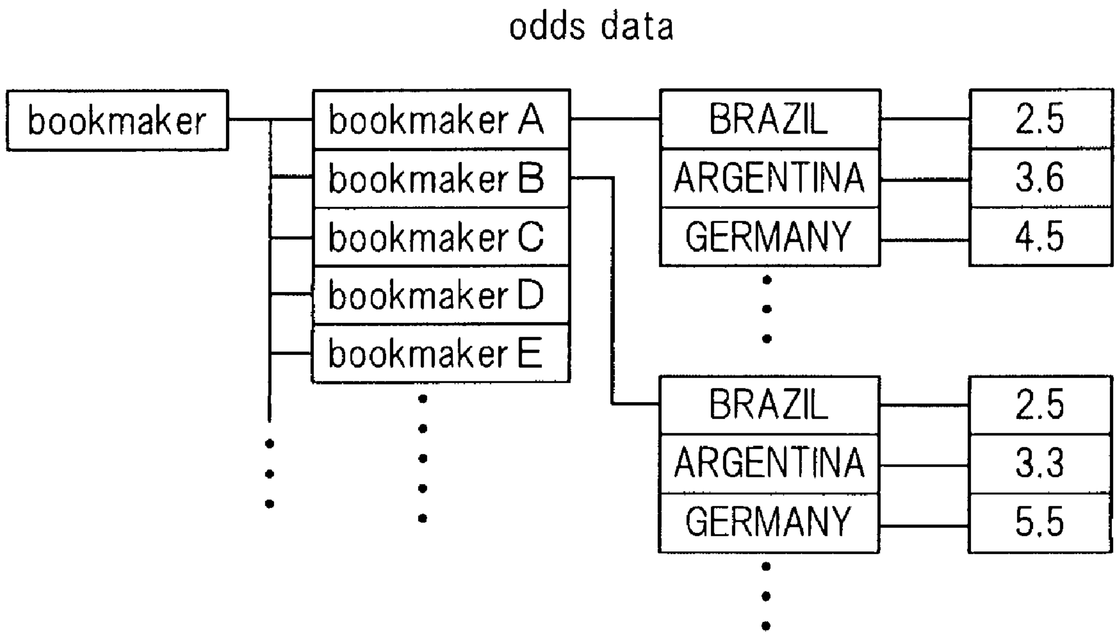
FIG. 6 shows odds data to be stored in a hard disk drive of a server.

The hard disk drive 205 stores the room number data provided from each hotel and the odds data provided from each bookmaker. As shown in FIG. 5, the room number data of each hotel is hierarchically stored for each hotel. Further, the odds data is hierarchically stored for each bookmaker, as shown in FIG. 6. In addition, the hard disk drive 205 stores a player information database. The player information database stores the player ID of the player own for identifying the player, password, the number of coins acquired in a game and the ranking of the acquired pieces, in a table form, as shown in FIG. 7.

(Processing Operation)

Figure 8:
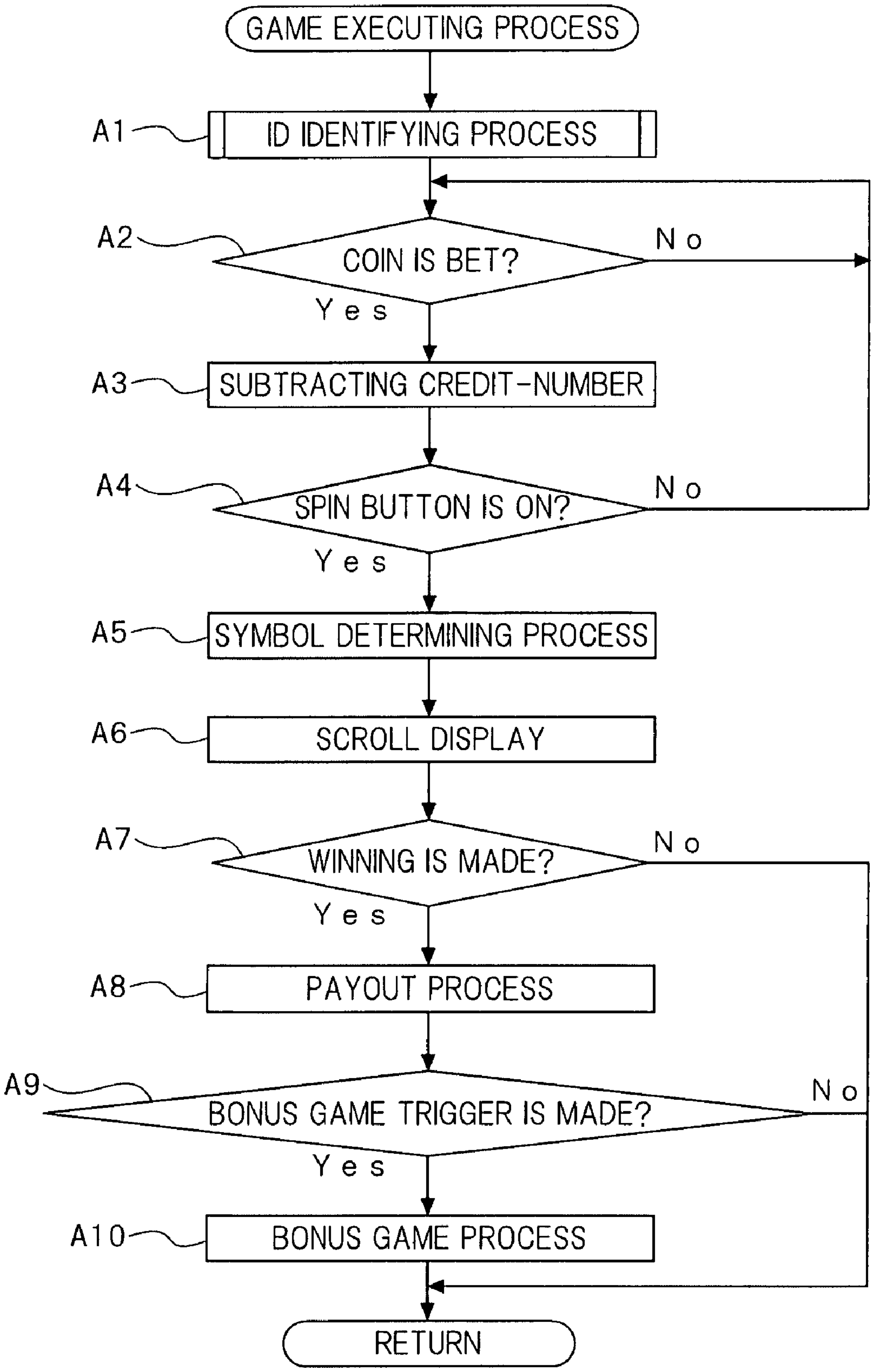
FIG. 8 is a flow chart of a game executing process.

In the followings, it will be described a game executing process that is carried out in the gaming machine 10, with reference to FIG. 8. When the main CPU 41 reads out and executes the game program, a game is started. In the game executing process, an ID identifying process, which will be described later, is carried out (A1) and it is then determined whether a coin is bet (A2). In this process, it is determined whether it is received an input signal from the 1-BET switch 26S as the 1-BET button 26 is pushed and whether it is received an input signal from the MAX-BET switch 27S as the MAX-BET button 27 is pushed. When the coin is not bet (A2, No), the step of A2 is re-executed and the gaming machine is under standby state until a coin is bet.

In the mean time, when the coin is bet (A2, Yes), the credit-number stored in the RAM 43 is subtracted, correspondingly to the number of coins bet (A3). Meanwhile, when the number of coins bet is larger than the credit-number stored in the RAM 43, A2 is re-executed without the process of subtracting the credit-number.

Then, it is determined whether the spin button 23 is ON or not (A4). When the spin button 23 is not ON (A4, No), the process is returned to the step of A2. Meanwhile, in case that the spin button 23 is not ON (for example, the spin button 23 is not ON and an instruction to end the game is inputted), it is canceled the subtraction result in the step of A3.

In the mean time, when the spin button 23 is ON (A4, Yes), a symbol determining process is executed (A5). In other words, a stop symbol determining program stored in the RAM 43 is executed, so that it is determined the symbols that will be stopped in the nine respective stages of the display windows 151~153. Thereby, it is determined a combination of symbols to be stopped on the payline L.

Next, the symbols 180 of the display windows 151~153 are scroll-displayed (A6). In the mean time, the scroll process is such that the symbols are scrolled and then the symbols determined in the step of A5 are stopped (rearranged) in the display windows 151~153.

Then, it is determined whether a combination of symbols stopped on the payline L is a winning combination or not (A7). When it is not a winning combination (A7, No), this routine is ended.

In the mean time, when it is a winning combination (A7, Yes), a payout process is executed (A8). In other words, when a win of the winning combination is made, it is calculated a payout-number of coins based on the win. When the paid out coins are deposited, a predetermined credit-number is added to the credit-number stored in the RAM 43. In the mean time, when the coins are paid out, a control signal is transmitted to the hopper 66 to pay out a predetermined number of coins.

Next, it is determined whether it is made a bonus trigger as a winning combination. In other words, it is determined whether a combination of "APPLE", which is a kind of the symbols, is arranged on the payline L (A9). When it is determined that the bonus trigger is made (A9, Yes), a bonus game process is executed (A10). In the mean time, when the bonus trigger is not made (A9, No), it means a blank. As a result, this routine is ended.

Figure 9:
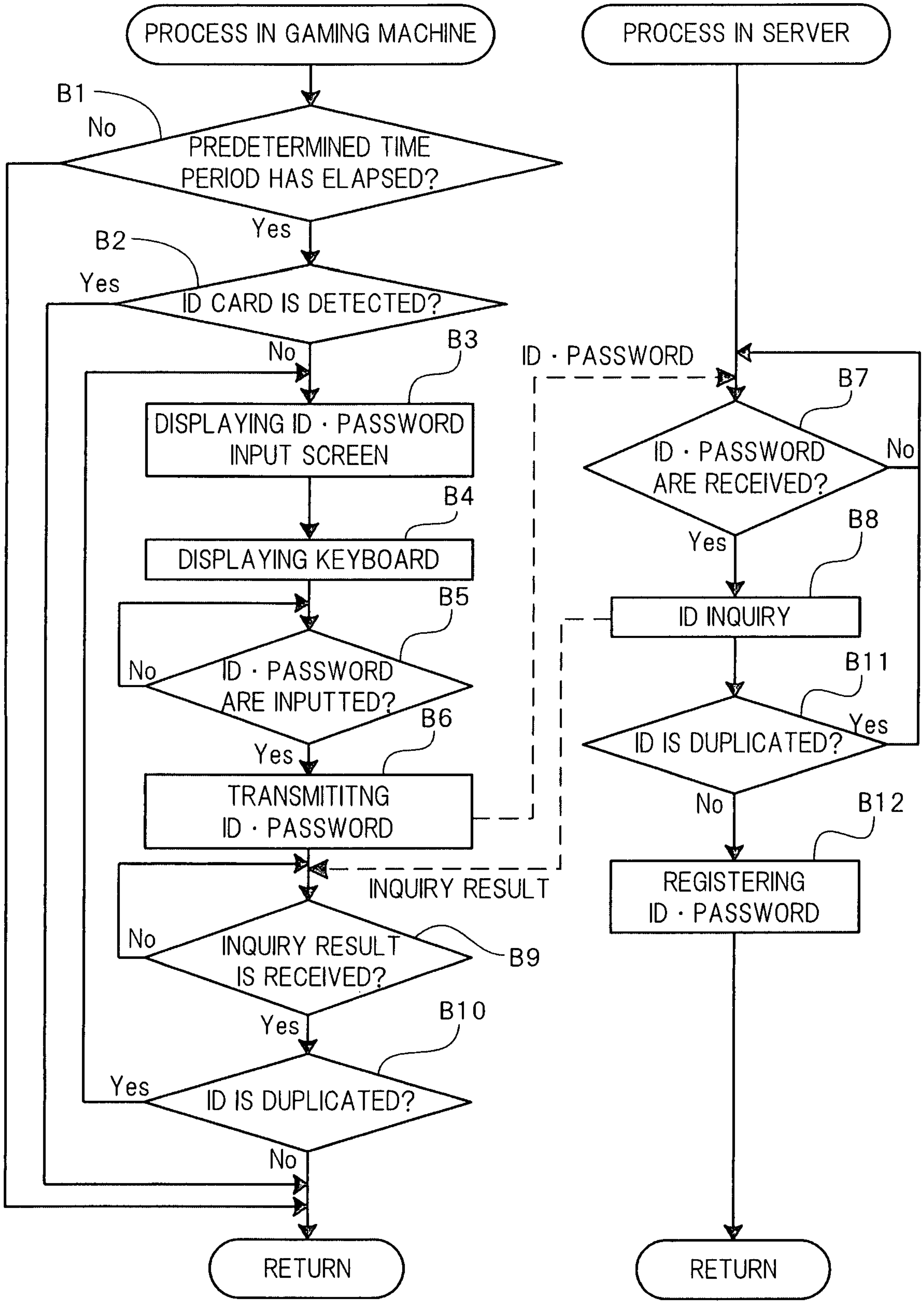
FIG. 9 is a flow chart of an ID identifying process.

In the followings, the ID identifying process of the A1 step that is carried out between the gaming machine 10 and the server 200 will be described with reference to FIGS. 9 and 10.

Firstly, the gaming machine 10 determines whether a predetermined time period has elapsed from the previous game (B1). When the predetermined time period has not elapsed (B1, No), it is determined that the same player continues to play the game. As a result, this sub routine is ended. Contrary, when the predetermined time period has elapsed (B1, Yes), it is determined that a player is changed and it is then determined whether a smart card is inserted into the card reader 36 (B2). When a smart card is inserted into the card reader 36 (B2, Yes), a user ID is read from the smart cart and is stored in the RAM 43. Then, this sub routine is ended.

Figure 10:
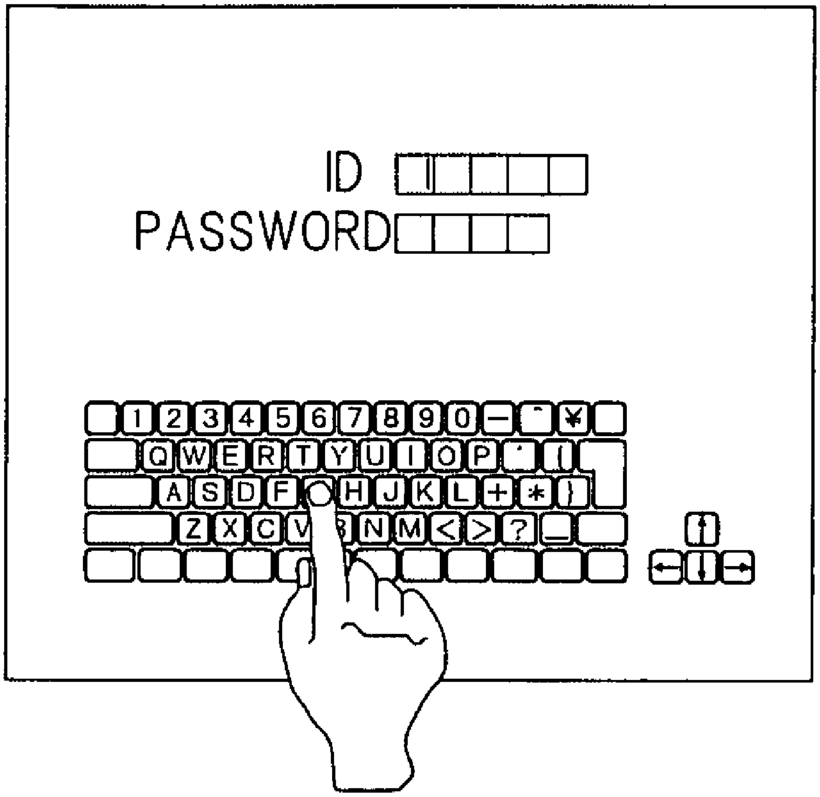
FIG. 10 is an ID and password input screen to be displayed in a lower image display panel in an ID identifying process.

When a smart card is not inserted into the card reader 36 (B2, No), an ID•password input screen for inputting a user ID and password is displayed in the lower image display panel 16 (B3), as shown in FIG. 10. In addition, a keyboard image with which the touch panel 69 is operated is displayed in the lower image display panel 16 (B4). Thereby, the input of the text information of the user ID and password is easily enabled. Then, it is determined whether the user ID and password are inputted through the touch panel 69 (B5). When the user ID and password are inputted (B5, Yes), the user ID and password are stored in the RAM 43 and the user ID and password stored in the RAM 43 are transmitted to the server 200 (B6). In the mean time, when the user ID and password are not inputted (B5, No), the gaming machine is under standby state for an input of the user ID and password.

The server 200 determines whether the user ID and password are received through the above process (B7). When the user ID and password are received (B7, Yes), the server refers to the player information database stored in the hard disk drive 205 to inquire the user ID (B8). Thereby, a duplicate registration of the inputted user ID is prevented. In the process of B8, an inquiry result is transmitted to the gaming machine 10. Meanwhile, when the server 200 does not receive the user ID and password (B7, No), the server is under standby state for receiving the user ID and password.

In the mean time, the gaming machine 10 determines whether the inquiry result transmitted by the B8 process is received or not (B9). When the inquiry result is received (B8, Yes), it is determined whether the inputted used ID duplicates with the user ID stored in the database stored in the hard disk drive 205 of the server 200 (B10). When the inputted user ID duplicates with the user ID stored in the database (B10, Yes), the process is returned to the step of B3. In the mean time, when the inputted user ID does not duplicate with the user ID stored in the database (B10, No), this routine is ended.

In addition, the server 200 determines whether the user ID duplicates or not, based on the inquiry result after inquiring the user ID (B11). When the inputted used ID duplicates with the user ID stored in the database stored in the hard disk drive 205 of the server 200 (B11, Yes), the process is returned to the step of B7, so that the server waits for the receiving of the user ID and password. Meanwhile, when the inputted user ID does not duplicate with the user ID stored in the database (B11, No), the user ID and password are registered in the player information database stored in the hard disk drive 205 (B12) and the process is ended.

Figure 11:
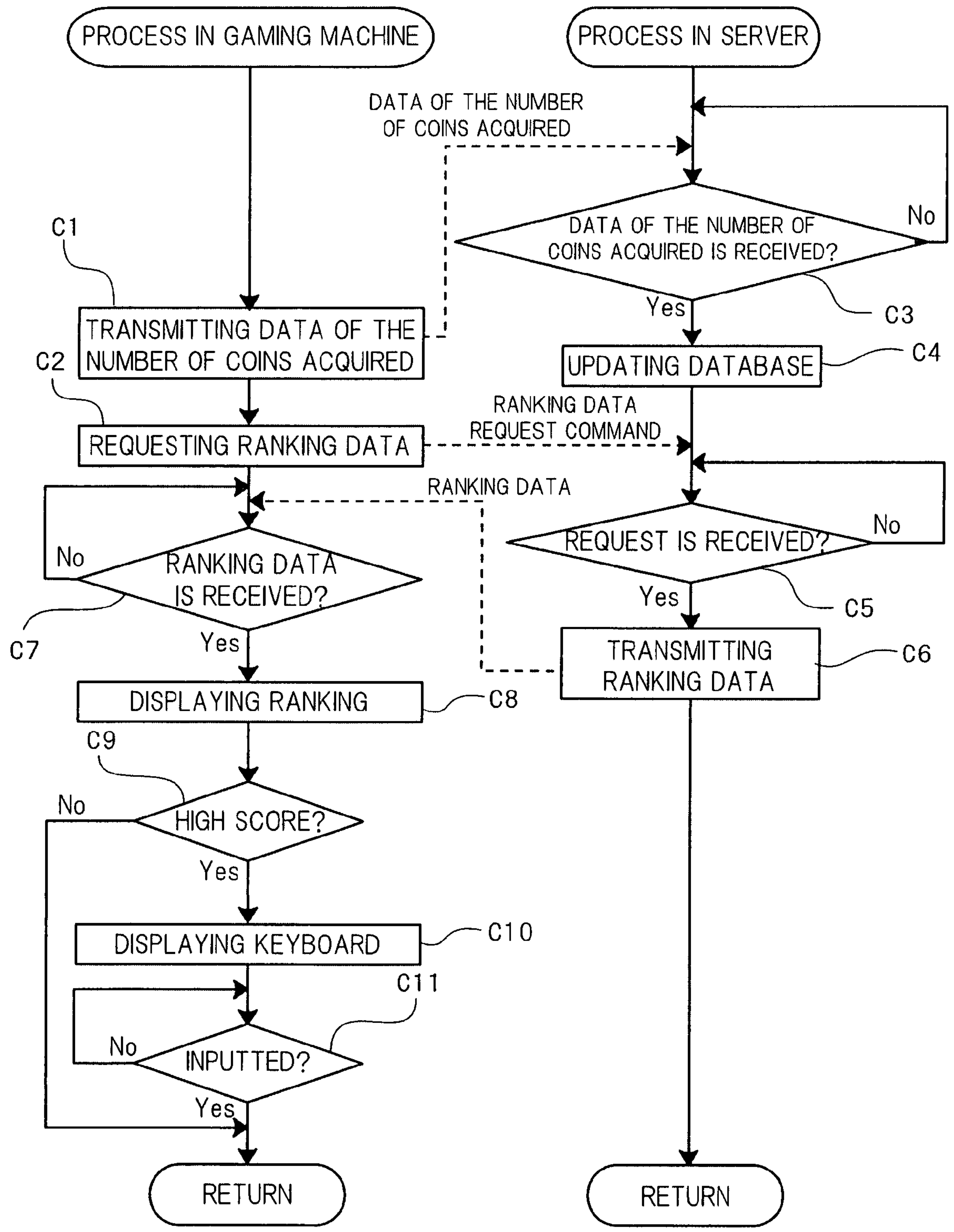
FIG. 11 is a flow chart of a ranking display process.
Figure 12:
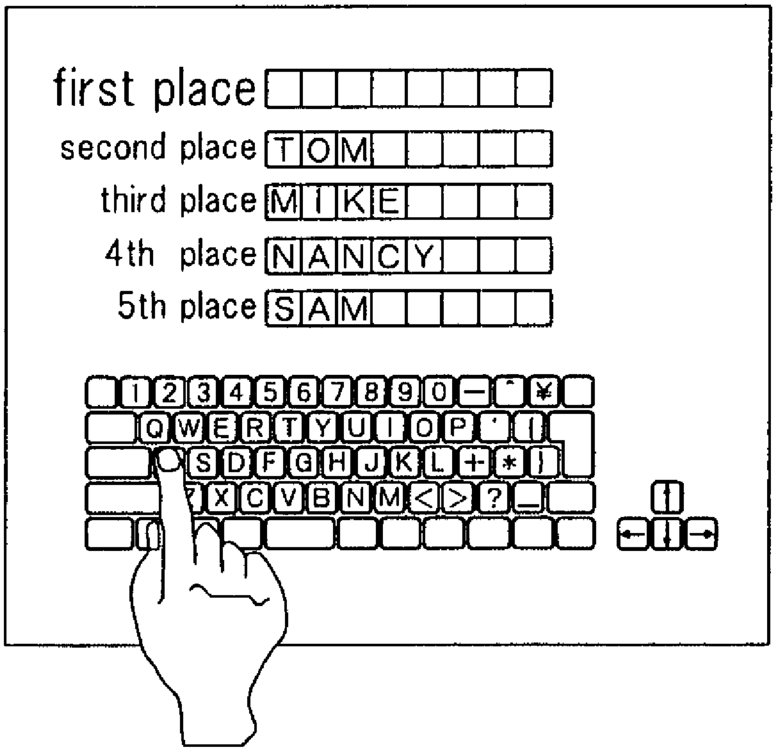
FIG. 12 is a ranking display screen to be displayed in a lower image display panel in a ranking display process.

In the followings, a ranking display process that is executed when a game is over will be described with reference to FIGS. 11 and 12.

Firstly, when ending a game, the gaming machine 10 transmits the data of the number of coins acquired in the game to the server 200 (C1) and transmits a ranking data request command to the server 200 (C2).

In the mean time, the server 200 determines whether the data of the number of coins acquired, which is transmitted in the process of C1, is received or not (C3). When the data of the number of coins acquired is received (C3, Yes), the number of coins acquired of the player information database stored in the hard disk drive 205 is updated, based on the data of the number of coins acquired (C4). In the mean time, when it is determined that the data of the number of coins acquired is not received (C3, No), the server is under standby state for receiving the data of the number of coins acquired. In addition, the server 200 determines whether the ranking data request command transmitted from the gaming machine 10 in the process of C2 is received or not (C5). When the command is received (C5, Yes), the server refers to the player information database to transmit the ranking data to the gaming machine 10 (C6). Meanwhile, when the ranking data request command is not received (C5, No), the server is under standby state for receiving the command. Then, the process in the server 200 is ended.

In the mean time, the gaming machine 10 determines whether the ranking data transmitted from the server 200 in the process of C6 is received or not (C7). When the ranking data is received (C7, Yes), a ranking screen is displayed in the lower image display panel 16 (C8), as shown in FIG. 12. In the mean time, when a ranking of a player is 5th place or lower (C9, Yes), a keyboard image with which the touch panel 69 is operated is displayed in the lower image display panel 16 (C10). Thereby, the text information input is easily enabled, which will be displayed in the ranking. In the mean time, when a ranking of a player is 6th place or higher (C9, No), this routine is ended.

Then, it is determined whether the text information to be displayed in the ranking through the operation of the touch panel 69 is inputted or not (C11). When the text information is inputted (C11, Yes), this routine is ended. Contrary, when the text information is not inputted (C11, No), the gaming machine waits for an input of the text information.

Figure 13:
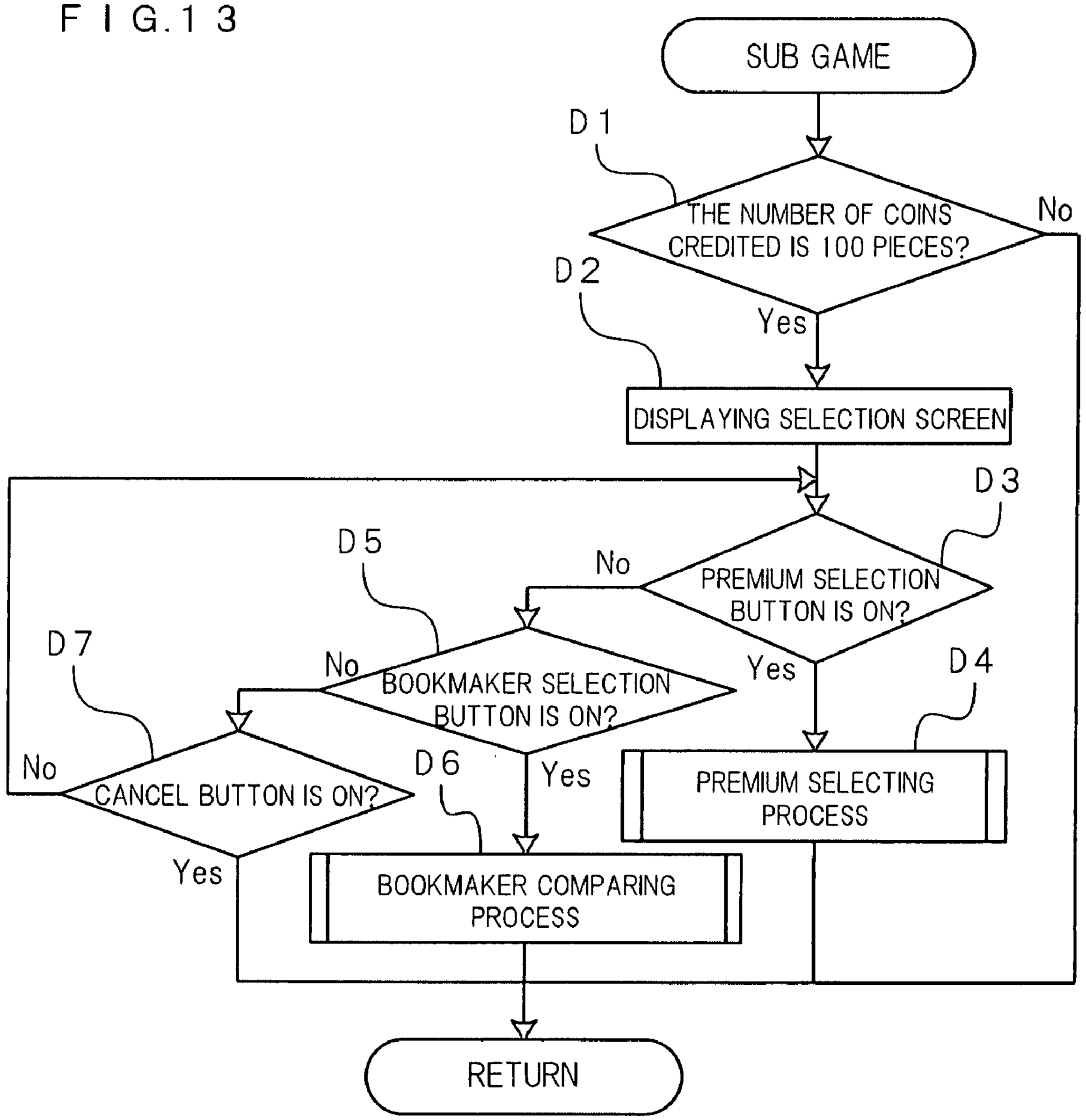
FIG. 13 is a flow chart of a sub game.
Figure 14:
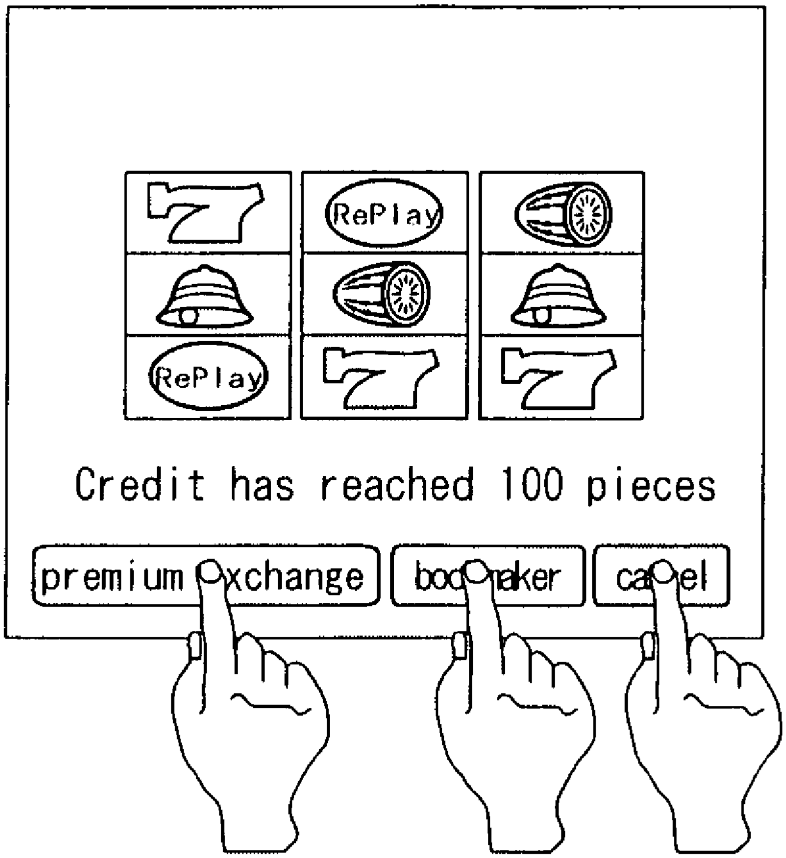
FIG. 14 is a sub game selection screen to be displayed in a lower image display panel in a sub game.

In the followings, a sub game, which is executed when the credit of coins acquired in a game reaches 100 pieces, will be described with reference to FIGS. 13 and 14.

Firstly, it is determined whether the number of coins to be credited in the RAM 43 reaches 100 pieces (D1). When the coins to be credited reaches 100 pieces (D1, Yes), it is displayed a selection screen of selecting whether the credited coins are exchanged with a premium or are bet on a predetermined event (D2), as shown in FIG. 14. Meanwhile, in the selection screen, it is displayed a premium exchange button, a bookmaker selection button and a cancel button, which are selected through the touch panel 69.

Then, it is determined whether a premium exchange button is pushed through the touch panel 69 (D3). When a premium exchange button is selected (D3, Yes), the process is shifted to a premium selecting process that will be described later (D4). Then, this routine is ended.

In the mean time, when a premium selection button is not selected (D3, No), it is determined whether a bookmaker selection button is pushed through the touch panel 69 (D5). When a bookmaker button is selected (D5, Yes), the process is shifted to a bookmaker comparing process (D6). Then, this routine is ended.

In addition, when a bookmaker selection button is not selected in the process of D5 (D5, No), it is determined whether a cancel button is pushed through the touch panel 69 (D7). When a cancel button is selected (D7, Yes), this routine is ended. Meanwhile, when a cancel button is not selected in the process of D7 (D7, No), the gaming machine is under standby state for the selection of each button (premium exchange button, bookmaker selection button, cancel button).

Figure 15:
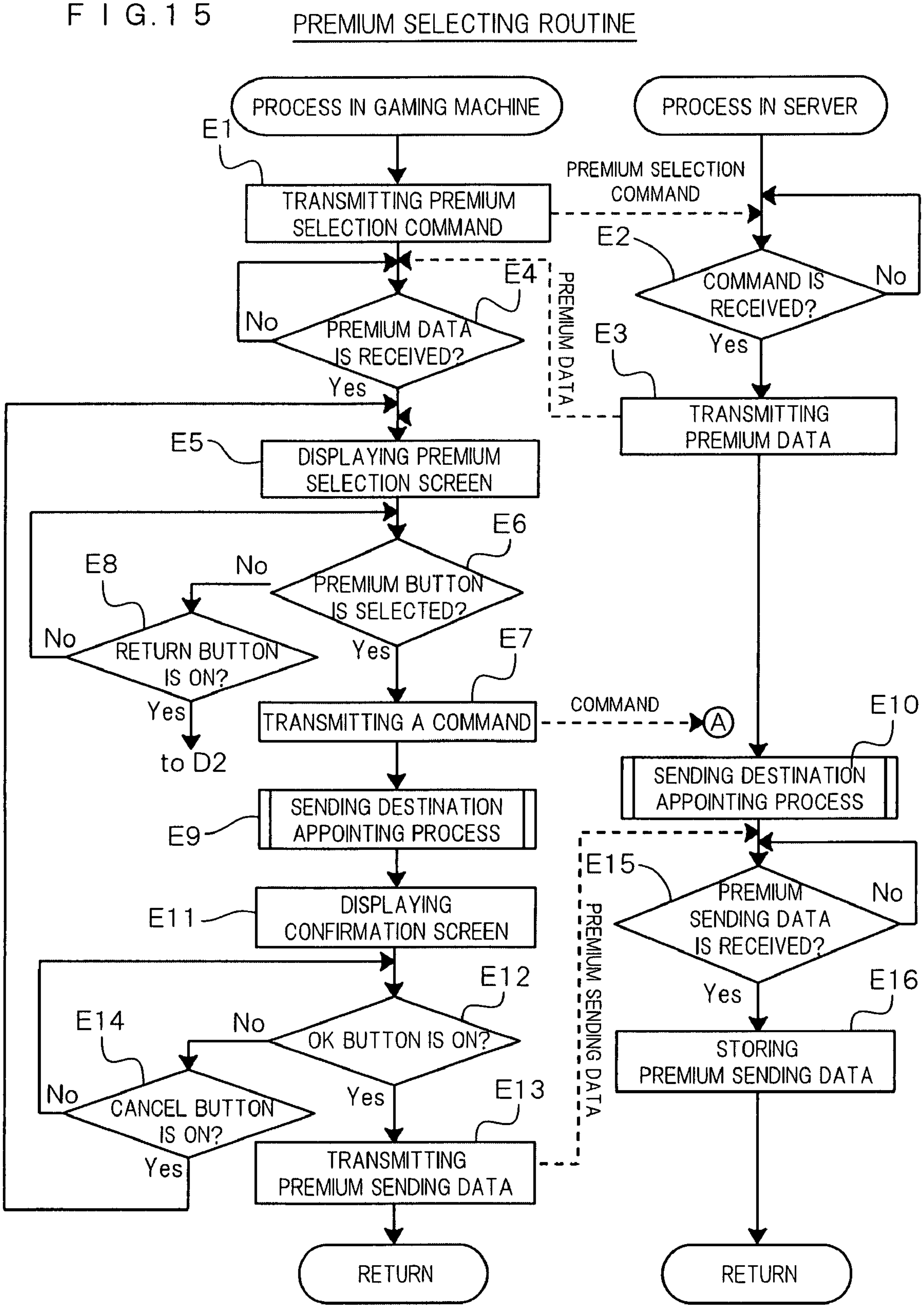
FIG. 15 is a flow chart of a premium selecting process.
Figure 16:
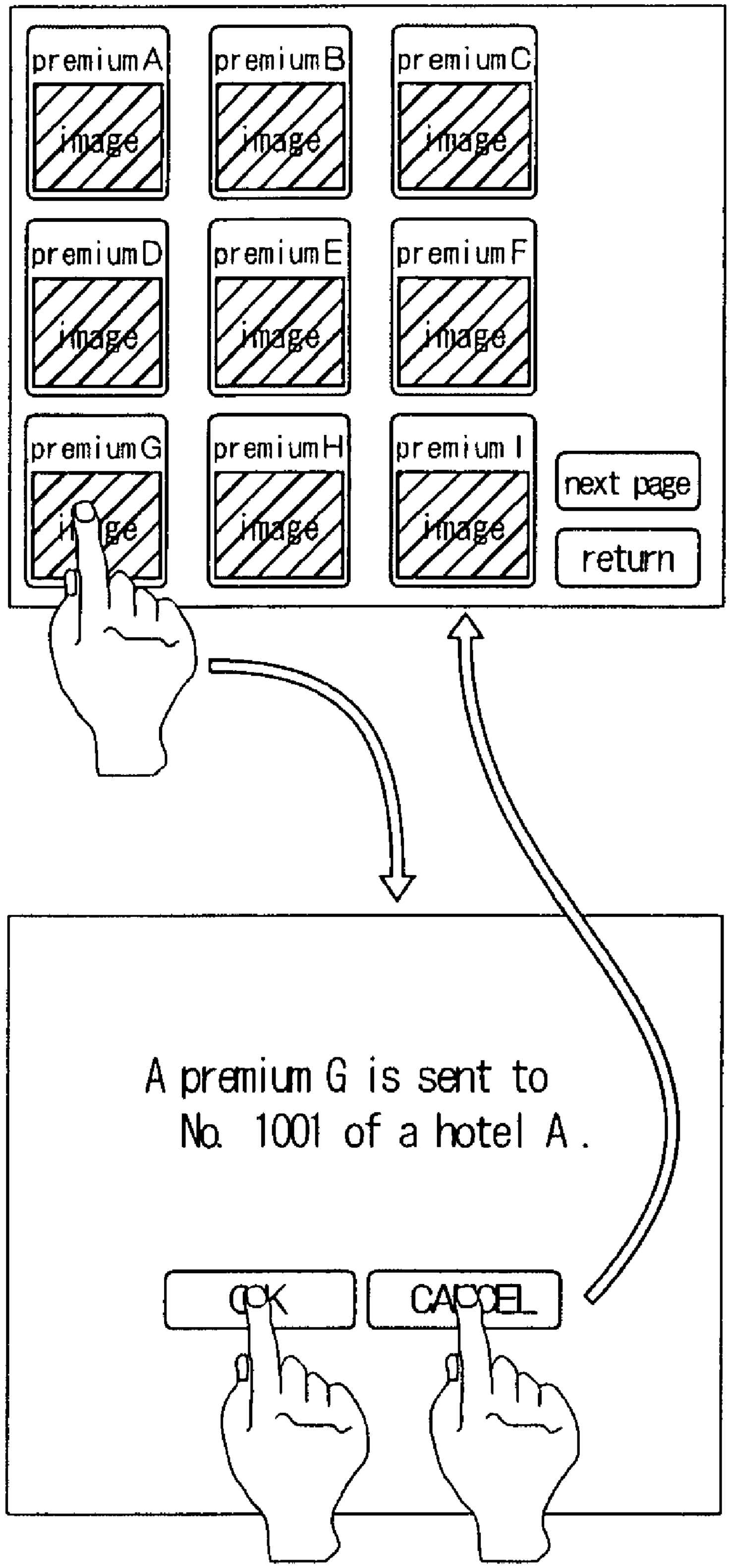
FIG. 16 is a screen to be displayed in a lower image display panel in a premium selecting process.

In the followings, the premium selecting process of D4 will be specifically described with reference to FIGS. 15 and 16. Firstly, as a premium exchange button is selected in the process of D3, the gaming machine 10 transmits a premium selection command to the server 200 (E1). Then, the server 200 determines whether the command is received or not (E2). When the command is received (E2, Yes), the server transmits a premium data to the gaming machine 10 (E3). In the mean time, when the command is not received (E2, No), the server is under standby state for receiving the command.

Then, the gaming machine 10 determines whether the premium data transmitted from the server 200 is received or not (E4). When the premium data is received (E4, Yes), a premium selection screen is displayed as shown in FIG. 16 (E5). In the premium selection screen, a premium button is displayed which is selected through the touch panel 69. The premium button displays a thumbnail image, which is an image of each premium, so that a player can easily select a premium. Thereby, the selection of a premium to be exchanged with the credits can be easily enabled. Contrary, when the premium data is not received (E4, No), the gaming machine is under standby state for receiving the premium data.

Then, it is determined whether a premium button displayed in the premium selection screen is pushed through the touch panel 69 (E6). When the premium button is selected (E6, Yes), a premium selection command relating to a premium selected is transmitted to the server 200 (E7). In the mean time, when the premium button is not selected (E6, No), it is determined whether a return button, which is displayed in the premium selection screen, is pushed through the touch panel 69 (E8). When the return button is selected (E8, Yes), the process is returned to D2 (refer to FIG. 13). Contrary, when the return button is not selected (E8, No), the gaming machine is under standby state for the selection of the button (each premium button and cancel button).

After the premium selection command is transmitted through the process of E7, the gaming machine 10 and the server 200 are shifted to a sending destination appointing process (E9, E10), which will be described later. After that, as shown in FIG. 16, in the gaming machine 10, a confirmation screen is displayed which displays a selected premium and a sending destination of the premium (Ell). Meanwhile, the confirmation screen displays an OK button and a cancel button, which are selected through the touch panel 69.

Then, it is determined whether an OK button displayed in the confirmation screen is pushed through the touch panel 69 (E12). When an OK button is selected (E12, Yes), the premium sending data is transmitted to the server 200 (E13). Then, this routine is ended. In the mean time, when an OK button is not selected (E12, No), it is determined whether a cancel button is pushed through the touch panel 69 (E14). When the cancel button is selected (E14, Yes), the process is returned to E5. When a cancel button is not selected (E14, No), the gaming machine is under standby state for the selection of an OK button and a cancel button.

In the mean time, after the sending destination appointing process (E10), the server 200 determines whether the premium sending data transmitted from the gaming machine 10 is received or not (E15). When the premium sending data is received (E15, Yes), the server stores the premium sending data (E16). Then, this routine is ended. Meanwhile, when the premium sending data is not received (E15, No), the server is under standby state for receiving the premium sending data. Like this, the server 200 stores the premium sending data relating to a premium to be exchanged with the coins credited.

Figure 17:
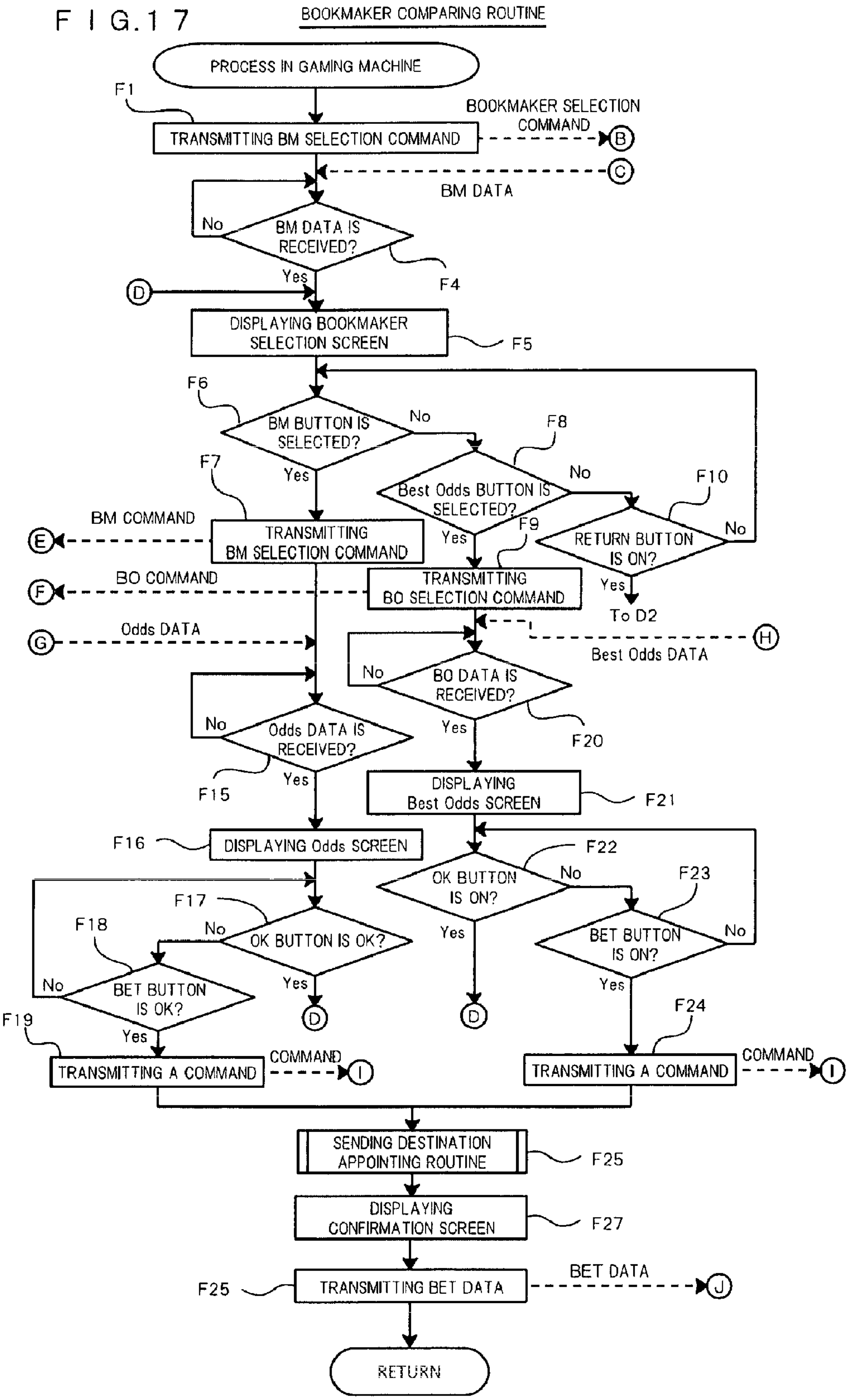
FIG. 17 is a flow chart of a bookmaker comparing process.
Figure 18:
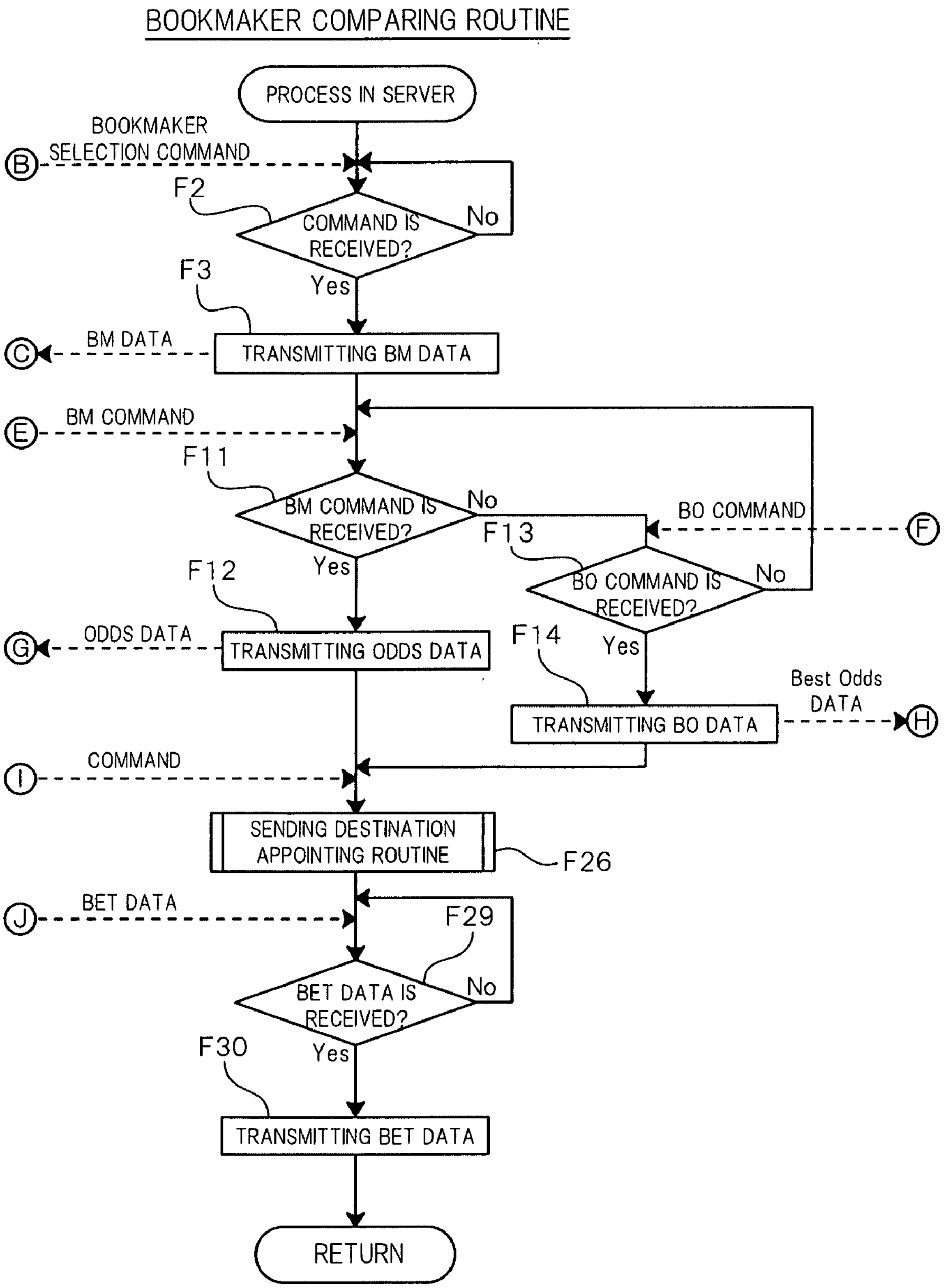
FIG. 18 is a flow chart of a bookmaker comparing process.
Figure 19:
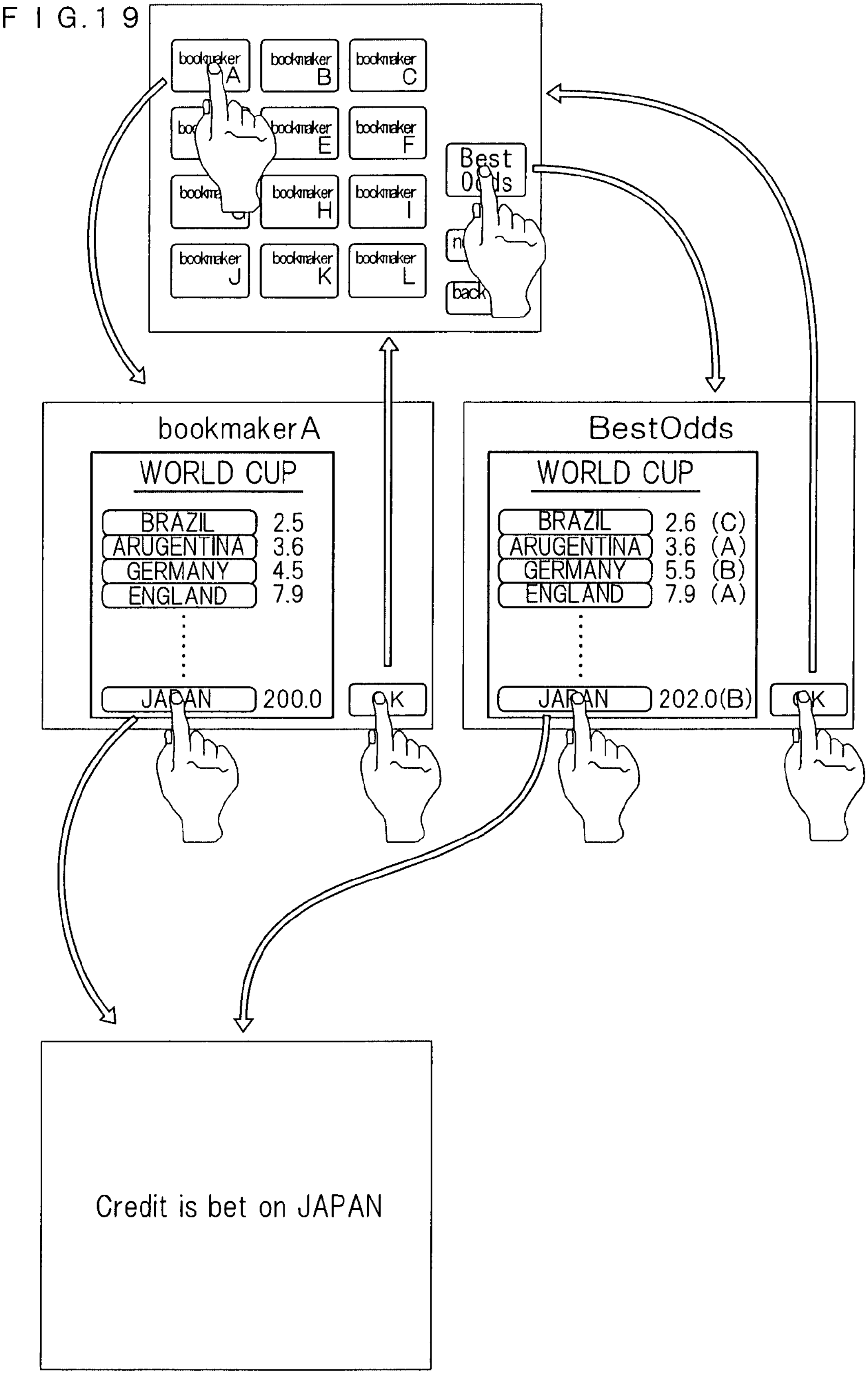
FIG. 19 shows a screen to be displayed in a lower image display panel in a bookmaker comparing process.

In the followings, the bookmaker comparing process of D6 will be specifically described with reference to FIGS. 17 to 19. Firstly, the gaming machine 10 transmits a bookmaker selection command, as the bookmaker selection button is selected in the process of D5 (F1). Then, the server 200 determines whether the command is received or not (F2). When the command is received (F2, Yes), the server transmits the bookmaker data to the gaming machine 10 (F3). Meanwhile, when the command is not received (F2, No), the server is under standby state for receiving the command.

The gaming machine 10 determines whether the bookmaker data transmitted from the server 200 is received (F4). When the bookmaker data is received (F4, Yes), a bookmaker selection screen is displayed as shown in FIG. 19 (F5). The bookmaker selection screen displays a plurality of bookmaker buttons and Best Odds buttons, which are selected through the touch panel 69. Contrary, when the bookmaker data is not received (F4, No), the gaming machine is under standby state for receiving the bookmaker data.

Then, it is determined whether a bookmaker button displayed in the bookmaker selection screen is pushed through the touch panel 69 (F6). When the bookmaker button is selected (F6, Yes), a bookmaker command relating to the bookmaker selected is transmitted to the server 200 (F7). Meanwhile, when a bookmaker button is not selected (F6, No), it is determined whether a Best Odds button displayed in the bookmaker selection screen is pushed through the touch panel 69 (F8). When the Best Odds button is selected (F8, Yes), a Best Odds command relating to the Best Odds button selected is transmitted to the server 200 (F9). Meanwhile, when a Best Odds button is not selected in the process of F8 (F8, No), it is determined whether a return button displayed in the bookmaker selection screen is pushed through the touch panel 69 (F10). When a return button is selected (F10, Yes), the process is shifted to D2 (FIG. 13). Contrary, when a return button is not selected (F10, No), the gaming machine is under standby state for the selection of each button (bookmaker button, Best Odds button, return button).

In the mean time, the server 200 determines whether the bookmaker command transmitted from the gaming machine 10 is received or not (F11). When the bookmaker command is received (F11, Yes), the odds data relating to the bookmaker selected is transmitted to the gaming machine 10 (F12). To be more specific, when a bookmaker command about a bookmaker A is transmitted and is received in the process of F7, the odds data set for the bookmaker A is transmitted to the gaming machine 10. Contrary, when the bookmaker command is not received (F11, No), it is determined whether the Best Odds command transmitted from the gaming machine 10 is received or not (F13). When the Best Odds command is received (F13, Yes), the Best Odds data is transmitted to the gaming machine 10 (F14). In addition, when the Best Odds command is not received in the process of F13 (F13, No), the server is under standby state for receiving the command.

After the process of F7, the gaming machine 10 determines whether the odds data transmitted from the server 200 is received or not (F15). When the odds data is received (F15, Yes), an odds display screen set by the bookmaker selected (in FIG. 19, odds display screen relating to the bookmaker A) is displayed (F16). Meanwhile, the display displays a plurality of BET buttons ("BRAZIL", "ARGENTINA" . . . "JAPAN") and OK button, which are selected through the touch screen 69. Then, it is determined whether an OK button is pushed through the touch panel (F17). When an OK button is selected (F17, Yes), the process is returned to F5. Meanwhile, when an OK button is not selected (F17, No), it is determined whether a BET button is pushed or not (F18). When a BET button is selected (F18, Yes), a command is transmitted to the server 200 (F19). When a BET button is not selected (F18, No), the gaming machine is under standby state for the selection of a button (BET button, OK button).

In addition, after the process of F9, the gaming machine 10 determines whether the Best Odds data transmitted from the server 200 is received (F20). When the Best Odds data is received (F20, Yes), the odds having combined odds advantageous to a player are displayed as shown in FIG. 19 (F21). Specifically, it is displayed the odds having combined the odds (having a high payout) advantageous to a player from each bookmaker setting the odds. Meanwhile, the display also displays a plurality of BET buttons and an OK button, which are selected through the touch panel 69. Then, likewise the processes of F17, F18 and F19, the processes of F22, F23 and F24 are carried out.

After a command is transmitted in the processes of F19 and F24, the gaming machine 10 and the server 200 are shifted to a sending destination appointing process (F25, F26). Then, as shown in FIG. 19, the gaming machine 10 displays a confirmation screen showing that a credit is bet (F27) and transmits the BET data to the server 200 (F28). Then, this routine is ended.

In the mean time, the server 200 determines whether the BET data transmitted from the gaming machine 10 is received or not (F29). When the BET data is received (F29, Yes), the BET data is transmitted to the bookmaker (F30). Meanwhile, when the BET data is not received (F29, No), the server is under standby state for receiving the BET data.

Figure 20:
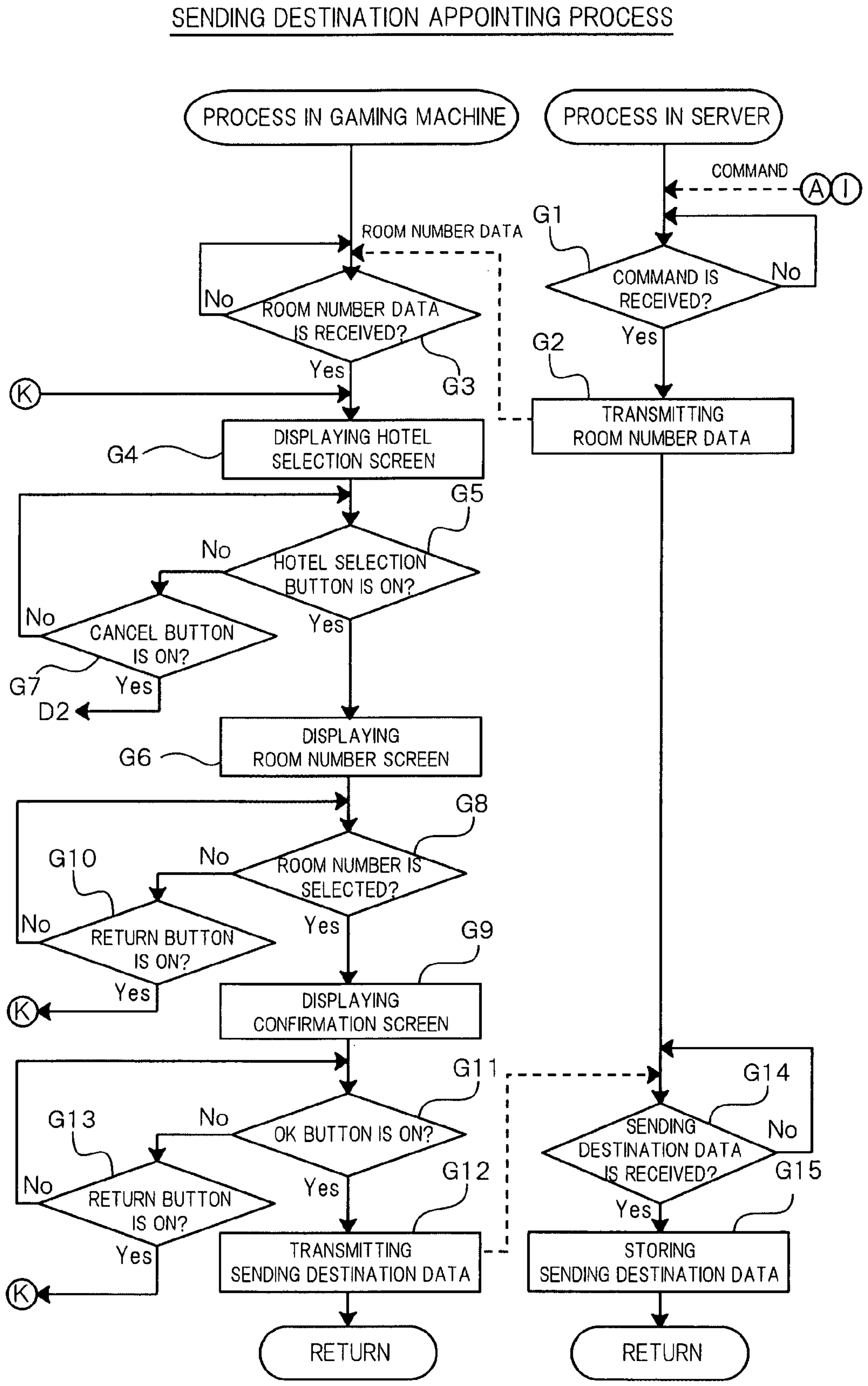
FIG. 20 is a flow chart of a sending destination appointing process.

In the followings, a sending destination appointing process of E8, E9, F25 and F26 will be specifically described with reference to FIG. 20. Firstly, the server 200 determines whether the command transmitted from the gaming machine 10 in the processes of E7, F19 and F24 is received or not (G1). When the command is received (G1, Yes), the server transmits the room number data to the gaming machine 10 (G2). Meanwhile, when the command is not received (G1, No), the server is under standby state for receiving the command.

Figure 21:
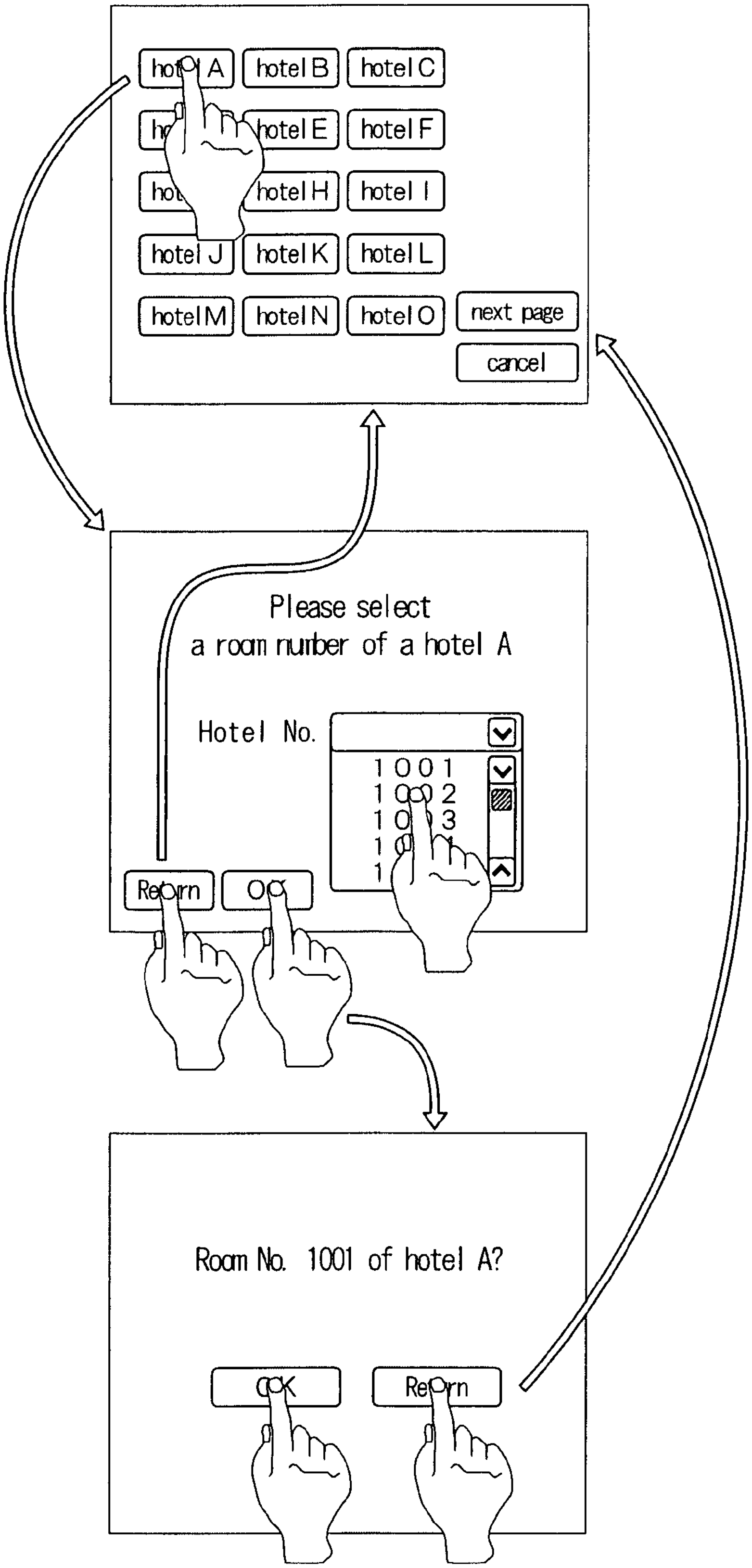
FIG. 21 is a screen to be displayed in a lower image display panel in a sending destination appointing process.

Then, the gaming machine 10 determines whether the room number data transmitted from the server 200 is received or not (G3). When the room number data is received (G3, Yes), a hotel selection screen is displayed as shown in FIG. 21 (G4). The hotel selection screen displays a hotel selection button that is selected through the touch panel 69. Thereby, a hotel is easily selected. To the contrary, when the room number data is not received (G3, No), the gaming machine is under standby state for receiving the room number data.

Then, it is determined whether a hotel selection button displayed in the hotel selection screen is pushed through the touch panel 69 (G5). When a hotel selection button is selected (G5, Yes), the room No. relating to the hotel selected are listed (G6). To be more specific, as shown in FIG. 21, when a button relating to a hotel A is selected in the process of G5, the room No. relating to the hotel A are displayed. Meanwhile, the screen displays a box listing the room No. through an operation of the touch panel 69, an OK button and a return button. Thereby, a room No. can be easily selected. In the mean time, when the hotel selection button is not selected (G5, No), it is determined whether a cancel button displayed in the hotel selection screen is pushed through the touch panel 69 (G7). When a cancel button is selected (G7, Yes), the process is returned to D2 (refer to FIG. 13). Meanwhile, when a cancel button is not selected in the process of G7 (G7, No), the gaming machine is under standby state for the selection of the button (hotel selection button, cancel button).

When a room No. is selected from the box and an OK button is selected (G8, Yes), a confirmation screen is displayed as shown in FIG. 21 (G9). Meanwhile, in the confirmation screen, it is displayed an OK button and a cancel button, which are selected through the touch panel 69. Contrary, when a room No. is not selected (G8, No) and a return button is pushed (G10, Yes), the process is returned to G4. Meanwhile, when a return button is not selected (G10, No), the gaming machine is under standby state for the selection of the room No. When an OK button is pushed through the touch panel 69 in the confirmation screen (G11, Yes), the sending destination data is transmitted to the server 200 (G12) and this routine is ended. Contrary, when an OK button is not selected (G11, No), it is determined whether a return button is pushed or not (G13). When a return button is selected (G13, Yes), the process is returned to G4. In addition, when a return button is not selected (G13, No), the gaming machine is under standby state for the selection of the button.

Then, the server 200 determines whether the sending destination data transmitted from the gaming machine 10 is received or not (G14). When the sending destination data is received (G14, Yes), the server stores the sending destination data and ends this routine. Meanwhile, when the sending destination data is not received (G14, No), the server is under standby state until the sending destination data is received.

(outline of this embodiment)

As described above, the gaming machine 10 of this embodiment comprises the lower image display panel 16 that displays an image, the communication interface 44 that acquires odds information from the server 200 storing a plurality of odds information provided from a plurality of bookmakers setting odds of a variety of events to be expected, and the graphic board 68 that displays, in the lower image display panel 16, an image about the odds information acquired by the communication interface 44.

According to the above structure, the plurality of odds information provided from the plurality of bookmakers is piled up in the server 200. The odds information of each bookmaker, which is transmitted from the server 200, is integrally displayed in the lower image display panel 16 of the gaming machine 10.

In addition, in the gaming machine 10 of this embodiment, the communication interface 44 acquires, from the server 200, the odds data provided from a predetermined bookmaker or the Best Odds data having combined the odds advantageous to the player from the odds provided from the clients. The graphic board 68 displays, in the lower image display panel 16, an image about the odds data acquired through the communication interface 44 or an image about the Best Odds data.

According to the above structure, the odds data provided from a predetermined bookmaker and the Best Odds data having combined the odds advantageous to the player from the odds provided from the bookmakers are piled up in the server 200. The odds data and the Best Odds data transmitted from the server 200 are displayed in the lower image display panel 16 of the gaming machine 10.

(modification of this embodiment)

Although the embodiment of the invention has been described, it is provided to illustrate a specific example, not to limit the invention. The specific structures can be appropriately changed. The actions and effects described in the embodiment of the invention are provided to enumerate the most suitable actions and effects to be obtained from the invention. In other words, the actions and effects of the invention are not limited to the embodiment of the invention described above.

For example, according to the embodiment, it is determined whether the credit-number stored in the RAM 43 reaches 100 pieces. When the credit-number reaches 100 pieces, a sub game selection screen is displayed in the lower image display panel 16. However, the invention is not limited thereto. For example, when the cash out button 25 is pushed, a sub game selection screen may be displayed in the lower image display panel 16.

In addition, according to the embodiment, when the credit-number reaches 100 pieces, a sub game selection screen is displayed in the lower image display panel 16. However, the invention is not limited thereto. For example, when the credit-number reaches a predetermined value, rather than 100 pieces, a sub game selection screen may be displayed in the lower image display panel 16.

What is claimed is:

1. A wagering gaming machine comprising:

a first mechanism by means of which a player can implement a wager of an amount of money or other gaming medium;

a second mechanism by means of which the player can be awarded an amount of money or other gaming medium upon the occurrence of a payout event;

one or more input devices that enable the player to provide input to the gaming machine;

a display unit that displays an image;

an odds information acquiring unit that acquires, from a server storing a plurality of sets of odds information provided by a plurality of clients setting a plurality of sets of odds that various possible results of a given event will occur, any one of the sets of odds information; and a display control unit that displays, in the display unit, an image about the odds information acquired by the odds information acquiring unit;

wherein the gaming machine operates in a first gaming mode comprising displaying a reel-based spinning reel game in the display unit, with the reels spinning in response to a wager being implemented by the player via the first mechanism;

wherein the gaming machine operates in a second gaming mode upon a predefined event occurring while the gaming machine is being played in the first gaming mode; and wherein the second gaming mode comprises the odds information acquiring unit acquiring and the display control unit displaying, as the any one of the sets of odds information and in accordance with a selection made by the player using the one or more input devices, 1) first odds information provided by one of the plurality of clients, selected by the player, for the given event or 2) second odds information for the given event that has been culled or filtered from among the plurality of sets of odds information for the given event provided by the plurality of clients so as to present to the player the most advantageous odds for each of the various possible results of the given event.

2. The gaming machine according to claim 1, wherein said one or more input devices comprise a touch panel provided on the display unit, with the display control unit displaying, in the display unit, an operation key image enabling the player to select any one of the image about the first odds information and the image about the second odds information using the touch panel.

3. The gaming machine according to claim 2, further comprising:

a value memory unit that stores a value acquired in the reel-based spinning reel game; and a determining unit that determines whether the value stored in the value memory unit reaches a predetermined amount;

wherein the predefined event comprises the determining unit determining that the value stored in the value memory unit has reached a predetermined amount such that the display control unit displays, in the display unit, an operation key image enabling the player to select whether the image about the odds information acquired by the odds information acquiring unit is displayed.

4. The gaming machine according to claim 2, further comprising:

a value memory unit that stores a value acquired in the reel-based spinning reel game; and an award button that awards the value stored in the value memory unit;

wherein when the award button is pushed, the display control unit displays, in the display unit, an operation key image enabling the player to select whether the image about the odds information acquired by the odds information acquiring unit is displayed.

5. A gaming system comprising:

a server that is connected in data communication with a plurality of clients setting a plurality of sets of odds information for various possible results of a given event and that stores the plurality of sets of odds information provided by the plurality of clients;

a wagering gaming machine that is connected in data communication with the server, including:

a first mechanism by means of which a player can implement a wager of an amount of money or other gaming medium;

a second mechanism by means of which the player can be awarded an amount of money or other gaming medium upon the occurrence of a payout event;

one or more input devices that enable the player to provide input to the gaming machine;

an odds information acquiring unit that receives any one of the sets of odds information from the server and that provides the odds information to the player;

a display unit that displays an image; and a display control unit that displays, in the display unit, an image about the odds information acquired by the odds information acquiring unit;

wherein the gaming machine operates in a first gaming mode comprising displaying a reel-based spinning reel game in the display unit, with the reels spinning in response to a wager being implemented by the player via the first mechanism;

wherein the gaming machine operates in a second gaming mode upon a predefined event occurring while the gaming machine is being played in the first gaming mode; and wherein the second gaming mode comprises the odds information acquiring unit acquiring and the display control unit displaying, as the any one of the sets of odds information and in accordance with a selection made by the player using the one or more input devices, 1) first odds information provided by one of the plurality of clients, selected by the player, for the given event or 2) second odds information for the given event that has been culled or filtered from among the plurality of sets of odds information for the given event provided by the plurality of clients so as to present to the player the most advantageous odds for each of the various possible results of the given event.

6. The gaming system according to claim 5, wherein said one or more input devices comprise a touch panel provided on the display unit, with the display control unit displaying, in the display unit, an operation key image enabling the player to select any one of the image about the first odds information and the image about the second odds information using the touch panel.

7. The gaming system according to claim 5 or 6, wherein the gaming machine further comprises:

a value memory unit that stores a value acquired in the reel-based spinning reel game; and a determining unit that determines whether the value stored in the value memory unit reaches a predetermined amount;

wherein the predefined event comprises the determining unit determining that the value stored in the value memory unit has reached a predetermined amount such that the display control unit displays, in the display unit, an operation key image enabling the player to select whether the image about the odds information transmitted from the server is displayed.

8. The gaming system according to claim 5 or 6, wherein the gaming machine further comprises:

a value memory unit that stores a value acquired in the reel-based spinning reel game; and an award button that awards the value stored in the value memory unit;

wherein when the award button is pushed, the display control unit displays, in the display unit, an operation key image enabling the player to select whether the image about the odds information transmitted from the server is displayed.

* * * * *